United States Patent
Boda et al.

(10) Patent No.: US 10,048,725 B2
(45) Date of Patent: Aug. 14, 2018

(54) VIDEO OUT INTERFACE FOR ELECTRONIC DEVICE

(75) Inventors: Ted Stephen Boda, San Jose, CA (US); Benjamin Stiglitz, Pittsburgh, PA (US); Haroon Saleem Sheikh, Campbell, CA (US)

(73) Assignee: APPLE INC., Cupertino, CA (US)

( * ) Notice: Subject to any disclaimer, the term of this patent is extended or adjusted under 35 U.S.C. 154(b) by 1473 days.

(21) Appl. No.: 12/694,210

(22) Filed: Jan. 26, 2010

(65) Prior Publication Data

US 2011/0181520 A1 Jul. 28, 2011

(51) Int. Cl.
*G06F 1/16* (2006.01)

(52) U.S. Cl.
CPC .......... *G06F 1/1639* (2013.01); *G06F 1/1645* (2013.01); *G06F 1/165* (2013.01); *G06F 1/1647* (2013.01); *G06F 1/1649* (2013.01); *G06F 1/1652* (2013.01)

(58) Field of Classification Search
CPC .... G06F 1/165; G06F 3/0481; G06F 3/04817; G06F 3/0488; G06F 1/1639; G06F 1/1645; G06F 3/041; G06F 3/04883; G06F 1/1647; G06F 1/1649; G06F 1/1652
USPC ..... 345/2.2, 156–184, 1.1, 1.2, 1.3, 2.1, 2.3; 715/700–864
See application file for complete search history.

(56) References Cited

U.S. PATENT DOCUMENTS

| | | | |
|---|---|---|---|
| 7,199,787 B2 * | 4/2007 | Lee et al. | 345/169 |
| 7,239,305 B1 * | 7/2007 | Nakano et al. | 345/179 |
| 7,240,287 B2 * | 7/2007 | Qureshi et al. | 715/730 |
| 7,313,764 B1 | 12/2007 | Brunner et al. | |
| 2005/0015731 A1 * | 1/2005 | Mak | G06F 3/0481 715/779 |
| 2005/0024341 A1 * | 2/2005 | Gillespie et al. | 345/173 |
| 2005/0259032 A1 * | 11/2005 | Morris | G06F 3/1423 345/1.1 |
| 2007/0159555 A1 * | 7/2007 | Chen et al. | 348/552 |
| 2007/0229516 A1 * | 10/2007 | Sugimoto | 345/473 |
| 2008/0034317 A1 | 2/2008 | Fard et al. | |
| 2008/0316211 A1 | 12/2008 | Clegg et al. | |
| 2009/0309886 A1 * | 12/2009 | Sneed | 345/520 |
| 2011/0119638 A1 * | 5/2011 | Forutanpour | 715/863 |

OTHER PUBLICATIONS

U.S. Appl. No. 12/704,344, filed Feb. 11, 2010, Anthony YS Fai.
U.S. Appl. No. 12/345,552, filed Dec. 29, 2008, Paul Bradford Vaughan.

* cited by examiner

*Primary Examiner* — William Boddie
*Assistant Examiner* — Saifeldin Elnafia
(74) *Attorney, Agent, or Firm* — Fletcher Yoder PC

(57) ABSTRACT

An electronic device is provided having a video out mode for providing output to an external display coupled to the electronic device. The electronic device may automatically detect connection of the external display and select a display mode from a list of display modes based on selection criteria. The video out mode may include a user interface for controlling a presentation displayed on the external display. The user interface may include controls, including touch-sensitive controls, for advancing the presentation, moving back in the presentation, navigating the presentation, exiting the video out mode, and displaying of a pointer on the external display.

22 Claims, 14 Drawing Sheets

VIDEO OUT INTERFACE FOR ELECTRONIC DEVICE

BACKGROUND

The present disclosure relates generally to electronic devices, and, more particularly to display and control of presentations and other viewable data from the electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The graphical user interface ("GUI") of an electronic device may accomplish a variety of tasks and present a variety of information to a user. The user sees and interacts with the GUI, so it is beneficial if the GUI presents information and choices to a user in a way that is not only pleasing and natural to the eye but conducive to efficient use of the underlying application and hardware.

Some electronic devices include the capability to display presentations and other graphic data on a display of the device. Additionally, some electronic devices may output data for display on an external device. Existing electronic devices may not provide an intuitive and efficient interface for displaying and controlling presentations and other graphics, on the display of the electronic devices or on external displays.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Devices and methods are provided that include an electronic device capable of detecting an external display and providing output to the external display in a video out mode. The electronic device may detect the list of modes of the external display and select a display mode from the list of modes. The video out mode may include a user interface displayed on the electronic device and having controls for controlling a presentation or other output displayed on the external display. For example, the controls may include advancing the presentation, moving back in the presentation, displaying a navigator pane, and exiting the video out mode. A pointer may be displayed on the external display based on detection of a touch on the user interface of the video out mode.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
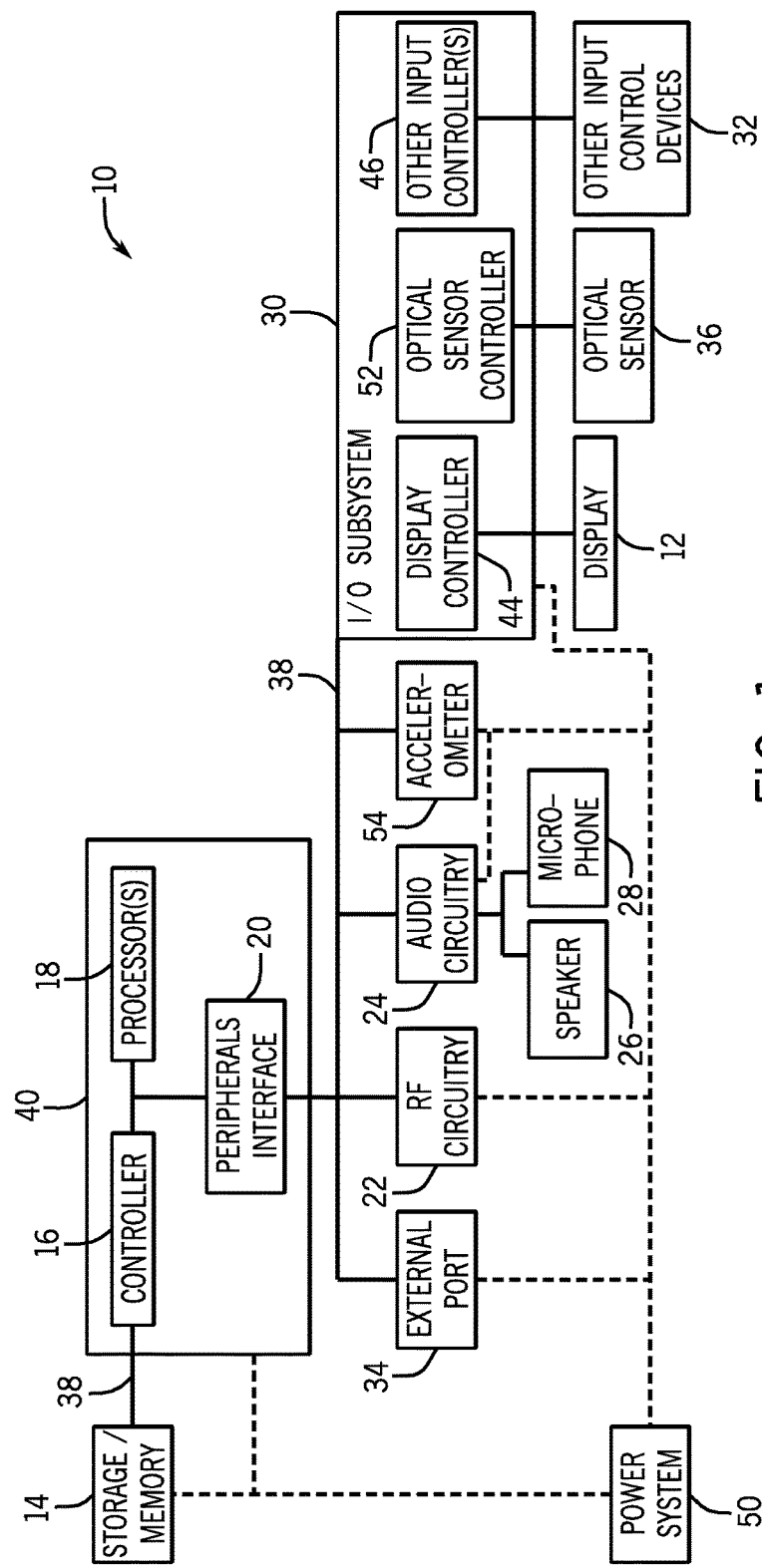
FIG. 1 is a block diagram of exemplary components of an electronic device that may be used in conjunction with aspects of the present disclosure.
Figure 2:
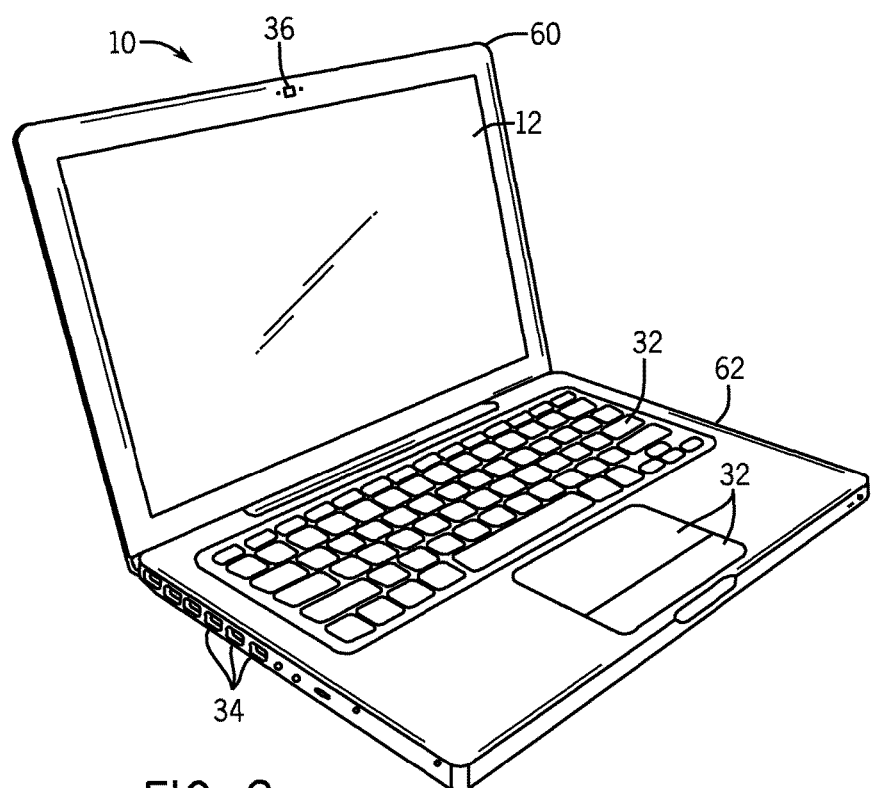
FIG. 2 is a perspective view of an electronic device in the form of a computer that may be used in conjunction with aspects of the present disclosure
Figure 3:
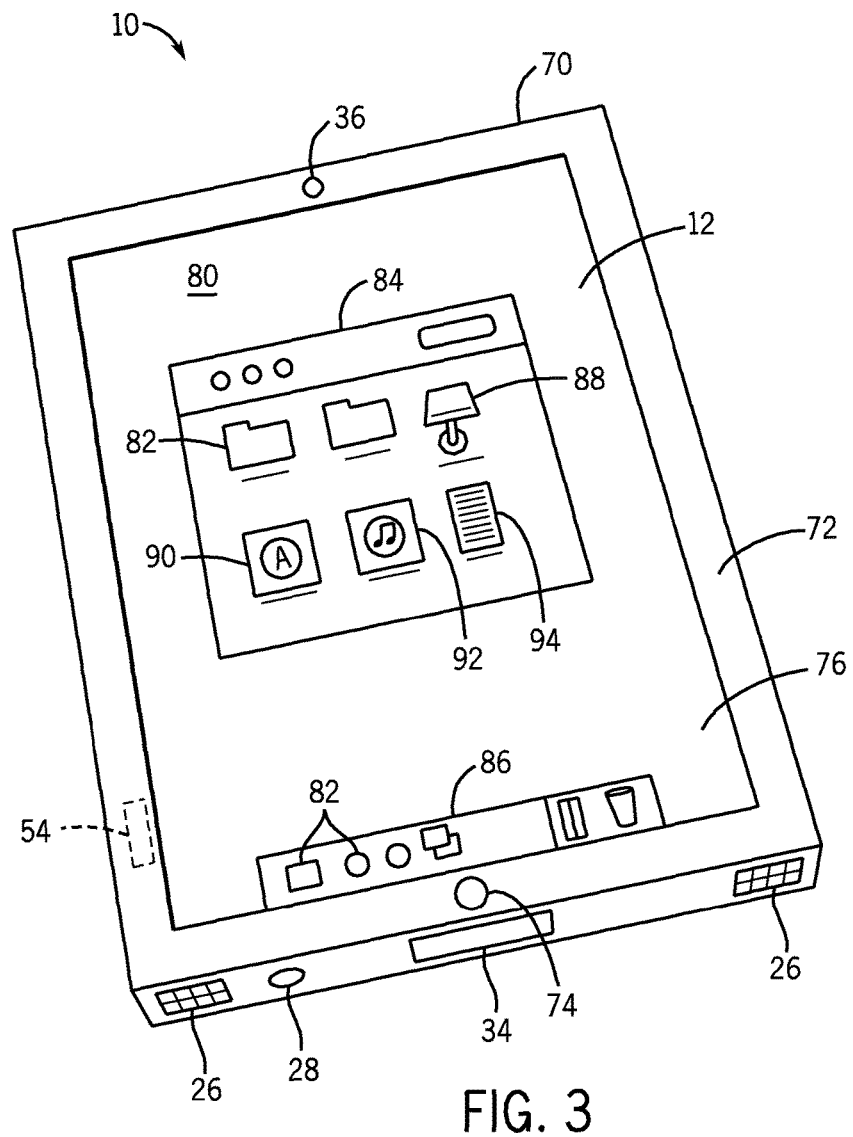
FIG. 3 is a perspective view of a tablet-style electronic device that may be used in conjunction with aspects of the present disclosure.

With these foregoing features in mind, a general description of suitable electronic devices for performing these functions is provided below. In FIG. 1, a block diagram depicting various components that may be present in electronic devices suitable for use with the present techniques is provided. In FIG. 2, one example of a suitable electronic device, here provided as a computer system, is depicted. In FIG. 3, another example of a suitable electronic device, here provided as a tablet-style device, is depicted. These types of electronic devices, and other electronic devices providing comparable display capabilities, may be used in conjunction with the present techniques.

The present disclosure is directed to a video out mode of an electronic device for providing output to an external display coupled to the electronic device. The electronic device may automatically detect connection of the external display and select a display mode from a list of display modes based on selection criteria. The video out mode may include a user interface for controlling a presentation displayed on the external display. The user interface may include controls, including touch-sensitive controls, for advancing the presentation, moving back in the presentation, navigating the presentation, and exiting the video out mode. Additionally, the user interface may enable display of a pointer on the external display.

An example of a suitable electronic device may include various internal and/or external components that contribute to the function of the device. FIG. 1 is a block diagram illustrating the components that may be present in such an electronic device 10 and which may allow the device 10 to function in accordance with the techniques discussed herein. As will be appreciated, various components of electronic device 10 may be provided as internal or integral components of the electronic device 10 or may be provided as external or connectable components. It should further be noted that FIG. 1 is merely one example of a particular implementation and is intended to illustrate the types of components and/or functionalities that may be present in electronic device 10.

In various embodiments, the electronic device 10 may be a media player, a cellular telephone, a laptop computer, a desktop computer, a tablet computer, a personal data organizer, an e-book reader (e-reader), a workstation, or the like. For example, in certain embodiments, the electronic device 10 may be a portable electronic device, such as a tablet device or a model of an iPod® or iPhone® available from Apple Inc. of Cupertino, Calif. In other embodiments, electronic device 10 may be a desktop, tablet, or laptop computer, including a MacBook®, MacBook® Pro, MacBook Air®, iMac®, Mac® Mini, or Mac Pro®, also available from Apple Inc. In further embodiments, electronic device 10 may include other models and/or types of electronic devices suitable for implementing the features disclosed herein.

As discussed herein, the electronic device 10 may be used to store and/or execute a variety of applications. Such applications may include, but are not limited to: drawing applications, presentation applications, a word processing applications, website creation applications, disk authoring applications, spreadsheet applications, gaming applications, telephone applications, video conferencing applications, e-mail applications, instant messaging applications workout support applications, photo management applications, digital camera applications digital video camera applications, web browsing applications, e-book reader applications, digital music player applications, and/or digital video player applications. Further, the electronic device 10 may be used to store, access, and/or modify data, routines, and/or drivers used in conjunction with such applications.

Various applications that may be executed on the electronic device 10 may utilize or share the same user interface devices, such as a touch-sensitive surface (e.g., a touch screen or touch pad), a mouse, a keyboard, and so forth. One or more functions of such interface devices, as well as corresponding information displayed on the electronic device 10, may be adjusted and/or varied from one application to the next and/or within a respective application. In this way, a common physical architecture (such as the interface devices provided by the electronic device 10) may support a variety of applications with user interfaces that are intuitive and transparent.

The depicted electronic device includes a display 12. In one embodiment, the display 12 may be based on liquid crystal display (LCD) technology, organic light emitting diode (OLED) technology, or light emitting polymer display (LPD) technology, although other display technologies may be used in other embodiments. In accordance with certain embodiments, the display 12 may include or be provided in conjunction with touch sensitive elements. Such a touch-sensitive display may be referred to as a "touch screen" and may also be known as or called a touch-sensitive display system.

In addition, the electronic device 10 may include one or more storage/memory components 14 (which may include one or more computer readable storage mediums), a memory controller 16, one or more processing units (CPUs, GPUs, and so forth) 18, a peripherals interface 20, RF circuitry 22, audio circuitry 24, a speaker 26, a microphone 28, an input/output (I/O) subsystem 30, input and/or control devices 32, and an external port 34. Further, in certain embodiments, the electronic device 10 may include one or more optical sensors 36. These components may communicate over one or more communication buses or signal lines 38.

It should be appreciated that the depicted electronic device 10 is only one example of a suitable device, and that the electronic device 10 may have more or fewer components than shown, may combine the functionality of two or more of the depicted components into a single component, or a may have a different configuration or arrangement of the components. Further, the various components shown in FIG. 1 may be implemented in hardware (including circuitry), software (including computer code stored on a computer-readable medium), or a combination of both hardware and software, including one or more signal processing and/or application specific integrated circuits.

With respect to the specific depicted components, the storage/memory component(s) 14 may include high-speed random access memory and/or may also include non-volatile memory, such as one or more magnetic disk storage devices, flash memory devices, or other non-volatile solid-state memory devices. Access to storage/memory components 14 by other components of the device 10, such as the processor 18 and the peripherals interface 20, may be controlled by one or more respective controllers 16, such as a memory controller, disk controller, and so forth.

The peripherals interface 20 couples various input and output peripherals of the electronic device 10 to the processor 18 and storage/memory components 14. The one or more processors 18 run or execute various software programs and/or sets of instructions stored in storage/memory components 14 (such as routines or instructions to implement the features discussed herein) to perform various functions on the electronic device 10 and/or to process data. In some embodiments, the peripherals interface 20, the processor 18, and the memory controller 16 may be implemented on a single chip, such as a chip 40. In other embodiments, these components and/or their functionalities may be implemented on separate chips.

The RF (radio frequency) circuitry 22 receives and sends RF signals, also called electromagnetic signals. The RF circuitry 22 converts electrical signals to/from electromagnetic signals and communicates with communications networks and other communications devices via the electromagnetic signals. The RF circuitry 22 may include known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 22 may communicate with networks, such as the Internet, also referred to as the World Wide Web (WWW), an intranet and/or a wireless network, such as a cellular telephone network, a wireless local area network (LAN) and/or a metropolitan area network (MAN), and/or other devices by wireless communication. The wireless communication may use any suitable communications standard, protocol and/or technology, including but not limited to Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., based upon the IMT Advanced standard), Long-Term Evolution Advanced (LTE Advanced), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), and/or Short Message Service (SMS), or any other suitable existing or later developed communication protocol.

The audio circuitry 24, the speaker 26, and the microphone 28 provide an audio interface between a user and the electronic device 10. In one embodiment, the audio circuitry 24 receives audio data from the peripherals interface 20, converts the audio data to an electrical signal, and transmits the electrical signal to the speaker 26. The speaker 26 converts the electrical signal to audible sound waves. The audio circuitry 24 also receives electrical signals converted by the microphone 28 from sound waves. The audio circuitry 24 converts the electrical signal to audio data and transmits the audio data to the peripherals interface 20 for processing. Audio data may be retrieved from and/or transmitted to the storage/memory components 14 and/or the RF circuitry 22 by the peripherals interface 20. In some embodiments, the audio circuitry 24 may include an output jack (e.g., an audio out jack or a headset jack). The output jack provides an interface between the audio circuitry 24 and removable audio input/output peripherals, such as output-only speakers, headphones or a headset with both output (e.g., a headphone for one or both ears) and input (e.g., a microphone).

The I/O subsystem 30 couples input/output peripherals on the electronic device 10, such as a display 12, and other input/control devices 32, to the peripherals interface 20. The I/O subsystem 30 may include a display controller 44 and one or more input controllers 46 for other input or control devices. The one or more input controllers 46 receive/send electrical signals from/to other input or control devices 32. The other input/control devices 32 may include physical buttons (e.g., push buttons, rocker buttons, etc.), dials, slider switches, joysticks, click wheels, a touch pad, and so forth. In some alternate embodiments, the input controller(s) 46 may be coupled to any (or none) of the following: a keyboard, infrared port, USB port, and/or a pointer device such as a mouse. Examples of input/control devices 32 in the form of buttons may include an up/down button for volume control of the speaker 26 and/or the microphone 28, on/off buttons, and/or buttons used to invoke a home screen on the display 12 of the electronic device 10.

When present, a display 12 implemented as a touch screen provides an input interface and an output interface between the electronic device 10 and a user. In one such embodiment, the display controller 44 receives and/or sends electrical signals from/to the display 12 and the corresponding touch sensitive elements. The display 12 displays visual output to the user. The visual output may include graphics, alphanumeric characters, icons, video, and so forth (collectively termed "graphics"). In some embodiments, some or all of the visual output may correspond to user-interface objects.

In embodiments employing a touch screen, the display 12 has a touch-sensitive surface, sensor or set of sensors that accepts input from the user based on haptic and/or tactile contact. The touch screen and the display controller 44 generate signals in response to contact (and any movement or breaking of the contact) on the display 12, and the signals may be received and processed in accordance with routines executing on the processor 18 such that the signals (and the contact they represent) are recognized as interactions with user-interface objects that are displayed on the display 12. In an exemplary embodiment, a point of contact between a touch screen 12 and the user corresponds to an appendage, e.g., a finger, of the user, and/or a stylus wielded by the user.

In embodiments where a touch screen is employed, the display 12 and the display controller 44 may detect contact and/or movement (or breaks in such movement) using a suitable touch sensing technologies, including but not limited to capacitive, resistive, infrared, and surface acoustic wave technologies, as well as other proximity sensor arrays or other elements for determining one or more points of contact with the display 12. The user may make contact with such a touch sensitive display 12 using any suitable object or appendage, such as a stylus, a finger, and so forth. In some embodiments, a touch-sensitive display may be multi-touch sensitive, i.e., sensitive to multiple concurrent contacts. In an exemplary embodiment, projected mutual capacitance sensing technology is used, such as that found in the iPhone® and iPod Touch® from Apple, Inc. of Cupertino, Calif.

The electronic device 10 also includes a power system 50 for powering the various components. The power system 50 may include a power management system, one or more power sources (e.g., battery, alternating current (AC)), a recharging system, a power failure detection circuit, a power converter or inverter, a power status indicator (e.g., a light emitting diode (LED)) and any other components associated with the generation, management and distribution of power in electronic devices.

The electronic device 10 may also include one or more optical sensors 36. FIG. 1 shows an optical sensor 36 coupled to an optical sensor controller 52 in the I/O subsystem 30. The optical sensor 36 may include a charge-coupled device (CCD) or complementary metal-oxide semiconductor (CMOS) phototransistors. The optical sensor 36 receives light from the environment, projected through one or more lens, and converts the light to data representing an image. In conjunction with appropriate code executing on the processor 18, the optical sensor 36 may capture still images and/or video.

The electronic device 10 may also include one or more accelerometers 54. FIG. 1 shows an accelerometer 54 coupled to the peripherals interface 20. Alternately, the accelerometer 54 may be coupled to an input controller 46 in the I/O subsystem 30. In some embodiments, information is displayed on the display 12 in a portrait view or a landscape view based on an analysis of data received from the one or more accelerometers (e.g., based upon a position in which the electronic device 10 is presently oriented).

In some embodiments, the software components stored in storage/memory 14 may include an operating system, a communication module (or set of instructions), a contact/motion module (or set of instructions), a graphics module (or set of instructions), as well as any other suitable modules or instructions used in the operation of the device 10 or by interfaces or applications executing on the device 10. By way of example, an operating system may be based upon various software platforms, such as Darwin, RTXC, LINUX®, UNIX®, OS X, WINDOWS®, or an embedded operating system such as VxWorks, and may include various software components and/or drivers for controlling and managing general system tasks (e.g., memory management, storage device control, power management, etc.) and facilitates communication between various hardware and software components.

In addition, the software components stored in storage/memory 14 may include various applications and media (e.g., music, videos, e-books) loaded or purchased by a user of the device 10 to provide additional functionality to the device 10. By way of example only, the storage/memory 14 may be configured to store applications and media purchased and/or downloaded from the App Store® or from iTunes®, both of which are online services offered and maintained by Apple Inc.

The communication module facilitates communication with other devices over one or more external ports 34 and also includes various software components for handling data received by the RF circuitry 22 and/or the external port 34. The external port 34 (e.g., Universal Serial Bus (USB), FIREWIRE, Ethernet port, etc.) is adapted for coupling directly to other devices or indirectly over a network (e.g., the Internet, wireless LAN, etc.). In some embodiments, the external port 34 is a multi-pin (e.g., 30-pin) connector that is the same as, or similar to and/or compatible with the 30-pin connector used on iPod® devices.

The contact/motion module may facilitate the detection and/or interpretation of contact with a touch sensitive input device, such as a touch screen, click wheel or touch pad. The contact/motion module includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/ multiple finger contacts).

The graphics module includes various known software components for rendering and displaying graphics on the display 12 or other connected displays or projectors, including components for changing the intensity of graphics that are displayed. As used herein, the term "graphics" includes any object that can be displayed to a user. In some embodiments, the graphics module stores data representing graphics to be used. Each graphic may be assigned a corresponding code. The graphics module receives, from applications etc., one or more codes specifying graphics to be displayed along with, if necessary, coordinate data and other graphic property data, and then generates screen image data to output to the display controller 44.

Examples of applications that may be stored in storage/ memory 14 may include work productivity applications as well as other applications. Examples of such applications may include word processing applications, image editing applications, drawing applications, presentation applications, JAVA-enabled applications, encryption, digital rights management, voice recognition, and voice replication.

With the foregoing discussion of the functional and structural components of an electronic device 10 in mind, FIGS. 2 and 3 depict examples of how such a device 10 may be implemented in practice. For example, FIG. 2 depicts an electronic device 10 in the form of a laptop computer 60. As shown in FIG. 2, the electronic device 10 in the form of a laptop computer 60 includes a housing 62 that supports and protects interior components, such as processors, circuitry, and controllers, among others. The housing 62 also allows access to user input devices 32, such as a keypad, touchpad, and buttons, which may be used to interact with the laptop computer 60. For example, the user input devices 32 may be manipulated by a user to operate a GUI and/or applications running on the laptop computer 60.

The electronic device 10 in the form of the laptop computer 60 also may include various external ports 34 that allow connection of the laptop computer 60 to various external devices, such as a power source, printer, network, or other electronic device. For example, the laptop computer 60 may be connected to an external projector through a cable connected to a respective external port 34 of the laptop computer 60.

In addition to computers, such as the depicted laptop computer 60 of FIG. 2, an electronic device 10 may take other forms, such as a portable multi-function device 70 (e.g., a cellular telephone or a tablet computing device) as depicted in FIG. 3. It should be noted that while the depicted multi-function device 70 is provided in the context of a tablet computing device, other types of portable or handheld devices (such as cellular telephones, media players for playing music and/or video, a camera or video recorder, personal data organizers, handheld game platforms, and/or combinations of such devices) may also be suitably provided as the electronic device 10. Further, a suitable multi-function device 70 may incorporate the functionality of more than one of these types of devices, such as a device that incorporates the functionality of two or more of a media player, a cellular phone, a gaming platform, a personal data organizer, and so forth. For example, in the depicted embodiment, the multi-function device 70 is in the form of a tablet computer that may provide various additional functionalities (such as the ability to take pictures, record audio and/or video, listen to music, play games, and so forth).

In the depicted embodiment, the handheld device 70 includes an enclosure or body 72 that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 70 to facilitate wireless communication.

In the depicted embodiment, the enclosure 72 includes user input structures 32 (such as the depicted button 74 and touch sensitive elements 76 incorporated into display 12 to form a touch screen) through which a user may interface with the device 70. Each user input structure 32 may be configured to help control a device function when actuated. For example, the button 74 may be configured to invoke a "home" screen or menu to be displayed. Other buttons, switches, rockers, and so forth may be provided to toggle between a sleep and a wake mode, to silence a ringer or alarm, to increase or decrease a volume output, and so forth.

In the depicted embodiment, the multi-function device 70 includes a display 12 that may be used to display a graphical user interface (GUI) 80 that allows a user to interact with the multi-function device 70. The GUI 80 may include various layers, windows, screens, templates, or other graphical elements that may be displayed in all, or a portion, of the display 12. The graphical elements may include icons 82 and other images representing buttons, sliders, menu bars, and the like. The icons 82 may be selected and/or activated via touching their locations on the display 12 in embodiments in which the display 12 is provided as a touch screen.

Generally, the GUI 80 may include graphical elements that represent applications and functions of the multi-function device 70. For instance, in the depicted embodiment, an operating system GUI 80 may include various graphical icons 82, each of which may correspond to various applications that may be opened or executed upon detecting a user selection (e.g., via keyboard, mouse, touchscreen input, voice input, etc.). The icons 82 may be displayed in a graphical dock 86 or within one or more graphical window elements 84 displayed on the screen of the display 12. By way of example only, the depicted icons 82 may represent a presentation application 88, such as Keynote® from Apple Inc., an application 90 for accessing the App Store® service from Apple Inc., an application 92 for accessing the iTunes® service from Apple Inc., as well as an e-reader/e-book application 94.

In some embodiments, the selection of a particular icon 82 may lead to a hierarchical navigation process, such that selection of an icon 82 leads to a screen or opens another graphical window that includes one or more additional icons 82 or other GUI elements. By way of example only, the operating system GUI 52 displayed in FIG. 4 may be from a version of the Mac OS® operating system, available from Apple Inc.

The multi-function device 70 also may include various external ports 34 that allow connection of the multi-function device 70 to external devices, such as computers, projectors, modems, telephones, external storage devices, and so forth. For example, one external port may be a port that allows the transmission and reception of data or commands between the multi-function device 70 and another electronic device, such as a computer. One or more of external ports 34 may be a proprietary port from Apple Inc. or may be an open standard I/O port.

With the foregoing discussion in mind, various techniques and algorithms for implementing aspects of the present disclosure on electronic devices 10 and associated hardware and/or memory devices are discussed below. For example, in certain implementations, an electronic device 10 may be employed to store and/or run a work productivity application or suite of applications. One example of such applications includes the Pages® word processing application, the Numbers® spreadsheet application, and the Keynote® presentation application, which are all provided within the iWork® application suite available from Apple Inc. of Cupertino, Calif. In certain embodiments, such applications, or aspects of such applications, may be encoded using a suitable object-oriented programming language, such as Objective-C, C++, C#, and so forth.

By way of example, a presentation application, such as Keynote® may be employed to generate and present slideshows, typically consisting of a sequential display of prepared slides. For example, turning to FIG. 4, an illustrative screen 120 of a presentation application is depicted in accordance with one embodiment of the disclosure. Such a presentation application may be stored as one or more executable routines in storage/memory 14 (FIG. 1) and, when executed, may cause the display of screens, such as screen 120, on a display 12, such as a display configured for use as a touch screen.

Prior to discussing the use or features of a presentation application in accordance with the present disclosure, it should be appreciated that, as used herein, a "slide" should be understood to refer to a discrete unit on which one or more objects may be placed and arranged. Such slides should also be understood to be discrete units or elements of an ordered or sequential presentation, i.e., the slides are the pieces or units that are assembled and ordered to generate the presentation. Such a slide, may be understood to function as a container or receptacle for a set of objects (as discussed below) that together convey information about a particular concept or topic of the presentation. A slide may contain or include different types of objects (e.g., text, numbers, images, videos, charts, graphs, and/or audio, and so forth) that explain or describe a concept or topic to which the slide is directed and which may be handled or manipulated as a unit due to their being associated with or contained on the slide unit.

The order or sequence of the slides in a presentation or slideshow is typically relevant in that the information on the slides (which may include both alphanumeric (text and numbers) and graphical components) is meant to be presented or discussed in order or sequence and may build upon itself, such that the information on later slides is understandable in the context of information provided on preceding slides and would not be understood or meaningful in the absence of such context. That is, there is a narrative or explanatory flow associated with the ordering or sequence of the slides. As a result, if presented out of order, the information on the slides may be unintelligible or may otherwise fail to properly convey the information contained in the presentation. This should be understood to be in contrast to more simplistic or earlier usages of the term "slide" and "slideshow" where what was typically shown was not a series of multimedia slides containing sequentially ordered content, but projected photos or images which could typically be displayed in any order without loss of information or content.

As used herein, the term "object" refers to any individually editable component on a slide of a presentation. That is, something that can be added to a slide and/or be altered or edited on the slide, such as to change its location, orientation, size, opacity, color, or to change its content, may be described as an object. For example, a graphic, such as an image, photo, line drawing, clip-art, chart, table, which may be provided on a slide, may constitute an object. Likewise, a character or string of characters may constitute an object. Likewise, an embedded video or audio clip may also constitute an object that is a component of a slide. Therefore, in certain embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein. In certain graphics processing contexts, the term "object" may be used interchangeably with terms such as "bitmap" or "texture".

Further, because a slide may contain multiple objects, the objects on a slide may have an associated z-ordering (i.e., depth) characterizing how the objects are displayed on the slide. That is, to the extent that objects on the slide may overlap or interact with one another, they may be ordered, layered or stacked in the z-dimension with respect to a viewer (i.e., to convey depth) such that each object is ordered as being above or beneath the other objects as they appear on the slide. As a result, in the event of an overlap of objects, a higher object can be depicted as overlying or obscuring a lower object. In this way, a slide may not only have a width and length associated with it, but also a depth (i.e., a z-axis).

Thus, as used herein, the term "slide" should be understood to represent a discrete unit of a slideshow presentation on which objects may be placed or manipulated. Likewise, an "object" as used herein should be understood to be any individually editable component that may be placed on such a slide. Further, as used herein, the term "transition" describes the act of moving from one slide to the next slide in a presentation. Such transitions may be accompanied by animations or effects applied to one or both of the incoming and outgoing slide. Likewise, the term "build" as used herein should be understood as describing effects or animations applied to one or more objects provided on a slide or, in some instances to an object or objects that are present on both an outgoing and incoming slide. For example, an animation build applied to an object on a slide may cause the object to be moved and rotated on the slide when the slide is displayed. Likewise, an opacity build applied to an object on a slide may cause the object to fade in and/or fade out on the slide when the slide is displayed.

Figure 4:
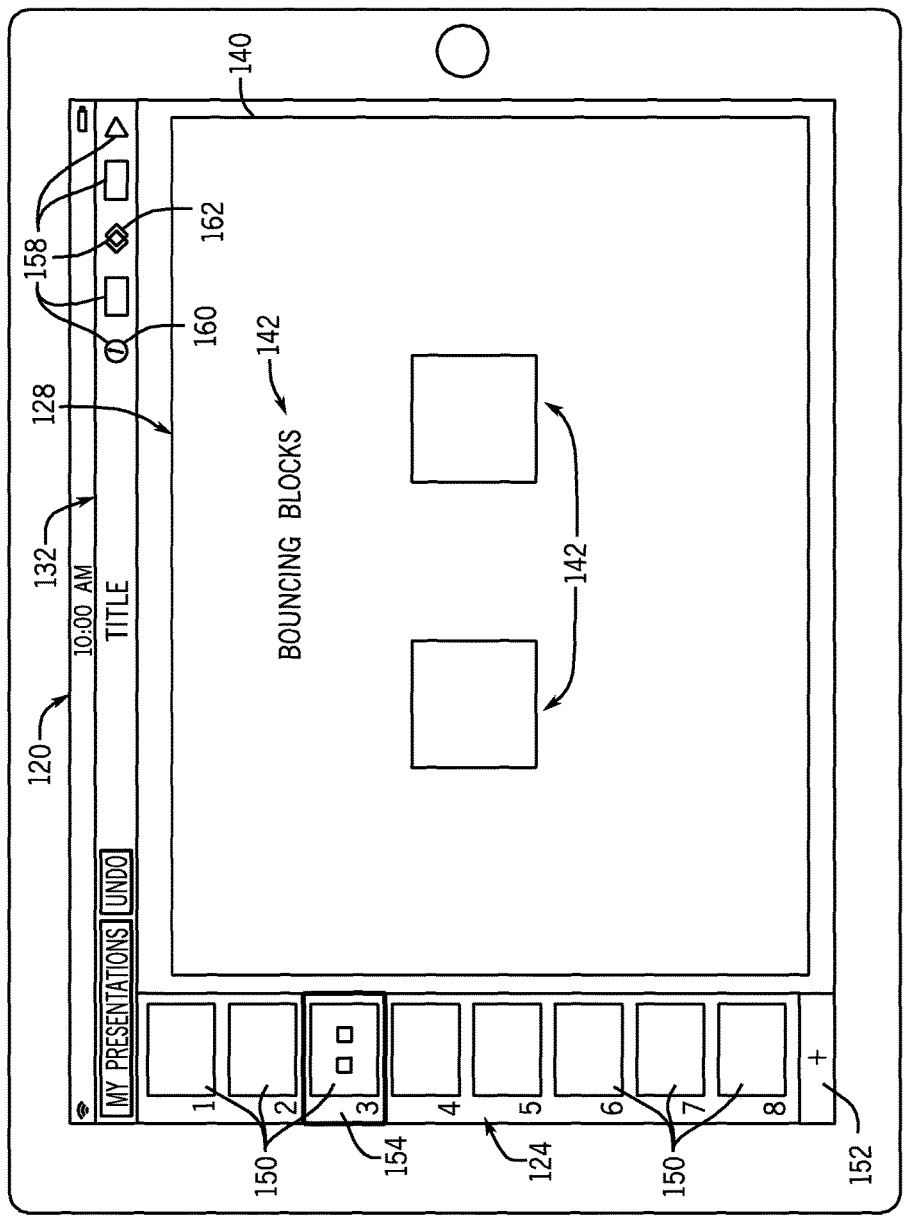
FIG. 4 depicts a screen of a presentation application used for generating slides in accordance with aspects of the present disclosure.

With the foregoing in mind, and turning to FIG. 4, it will be appreciated that, in certain embodiments a presentation application may provide multiple modes of operation, such as an edit mode, an animation mode, a presentation or play mode, and so forth. When in the edit mode, the presentation application may provide an interface for a user to add, edit, remove, or otherwise modify the slides of a slide show, such as by adding text, numeric, graphic, or video objects to a slide. Likewise, when in the animation mode, the presentation application may provide an interface for a user to apply and/or modify animation or effects applied to slide transitions between slides or to builds (e.g., animations, effects, and so forth) applied to objects on a slide. To display a created slide or a sequence of slides in a format suitable for audience viewing, a presentation mode of the presentation application may be employed which displays the slides, slide transitions, and object builds in a specified sequence. In some embodiments, the presentation application may provide a full-screen presentation of the slides in the presentation mode, including any animations, transitions, builds or other properties defined for each slide and/or object within the slides.

The screen 120 of FIG. 4 represents a screen that may be displayed when one embodiment of a presentation application is in an edit mode, such as for slide creation or modification. In the depicted example, the screen 120 includes three panes: a slide organizer or navigator pane 124, a slide canvas 128, and a toolbar 132 for creating and editing various aspects of a slide 140 of a presentation. By using these panes, a user may select a slide 140 of a presentation, add objects 142 to and/or edit objects 142 on the slide 140 (such as the depicted graphic objects and character objects), and animate or add effects related to the slide or the objects 142 on the slide 140.

The navigator pane 124 may display a representation 150 of each slide 140 of a presentation that is being generated or edited. The slide representations 150 may take on a variety of forms, such as an outline of the text in the slide 140 or a thumbnail image of the slide 140. Navigator pane 124 may allow the user to organize the slides 140 prepared using the application. For example, the user may determine or manipulate the order in which the slides 140 are presented by dragging a slide representation 150 from one relative position to another. In certain embodiments, the slides representations 150 in the navigator pane 124 may be indented or otherwise visually set apart for further organizational clarity. In addition, in certain embodiments, the navigator pane 124 may include an option 152 which, when selected, adds a new slide to the presentation. After being added, the slide representation 150 for such a new slide may be selected in the navigator pane 124 to display the slide 140 on the canvas 128 where objects 142 may be added to the new slide 140 and/or the properties of the new slide 140 may be manipulated.

In certain implementations, selection of a slide representation 150 in the navigator pane 124 results in the presentation application displaying the corresponding slide information on the slide canvas 128. For example, for a selected slide representation (here depicted as slide 3, identified by highlight region 154) the corresponding slide 140 may be displayed on the slide canvas 128. The displayed slide 140 may include one or more suitable objects 142 such as, for example, text, images, graphics, video, or any other suitable object. In some embodiments, a user may add or edit features or properties of a slide 140 when displayed on the slide canvas 128, such as slide transitions, slide background, and so forth. In addition, in some embodiments a user may add objects 142 to or remove objects 142 from the slide 140 or may manipulate an object 142 on the slide 140, such as to change the location or appearance of the object 142 or to add or edit animations or builds to the object 142. The user may select a different slide 140 to be displayed for editing on slide canvas 124 by selecting a different slide representation 150 from the navigator pane 124, such as by touching the displayed slide representation 150 in a touch screen embodiment of the device 10.

In the depicted implementation a user may customize objects 142 associated with the slide 140 or the properties of the slide 140 using various tools provided by the presentation application. For example, in certain embodiments, when in the edit mode, selection of a slide 140, object 142, and/or toolbar option 158 may cause the display of an interface presenting one or more selectable options for the selected slide 140 or object 142, which a user may then select, deselect, or otherwise manipulate to modify the slide 140 or object 142 as desired. For example, selection of certain toolbar options 158, such as an inspector or information icon 160, may cause properties of the selected object 142 or slide 140 to be displayed for review and/or modification. Likewise, selection of an animation mode icon 162 from among the toolbar options 158 may cause the presentation application to enter an animation mode from which builds or animations applied to objects and/or transitions assigned to slides may be reviewed, edited, and/or manipulated. Similarly, selection of a play mode icon 164 from among the toolbar options 158 may cause the presentation application to enter a presentation mode in which the slides 140 of the presentation are sequentially displayed on the display 12 or an attached display device.

In some embodiments, the electronic device 10 may be coupled to an external display to display slides from the presentation. For example, the external display may be a projector used to project the presentation on a screen for viewing by an audience or may be one or more connectable monitors, displays, televisions, and so forth suitable for receiving and playing and video, and possibly audio, content. In such embodiments, the electronic device 10 may include the ability to automatically detect connection of the external display and provide the appropriate output to the external display. The electronic device 10 may also display a video out mode having controls for controlling the presentation when the external display is connected. Further, the video out mode may include controls and provide for use of a pointer to highlight regions of interest on the presentation. FIGS. 5-13 below depict these features in greater detail. Although the description and figures below are discussed with reference to the multi-function electronic device 70, the features described below may be operable on different embodiments of the electronic device 10, e.g., the laptop 40 or the multi-function electronic device 70. For example, in some embodiments interface of the video out mode may be activated by a touchscreen, e.g., display 12, to provide faster and easier control though, in other embodiments, no touch-sensitive input device is employed.

For example, in certain embodiments a user may interact with touch sensitive elements 76 of the multi-function device 70 to implement some or all of the features discussed below. It should be appreciated that such interactions with the touchscreen, e.g., display 12, may be referred to as "gestures." Thus, as used below, the terms "select," "hold," and "move" with reference to the various image viewing or playing functions may include any suitable action involving an embodiment of the electronic device 10, whether including a touch-sensitive input structure or not, such that "select" may include touching a touchscreen with an appendage or stylus, or clicking a cursor location on a display with a mouse button or pressing a key on a keyboard. Similarly, "hold" may include maintaining contact between a touchscreen and an appendage or stylus, or maintaining depression of a mouse button or a key on a keyboard. In like manner, "move" may include moving an appendage or stylus over a touchscreen, or moving a cursor on a display by moving a mouse or depressing keys on a keyboard.

Figure 5:
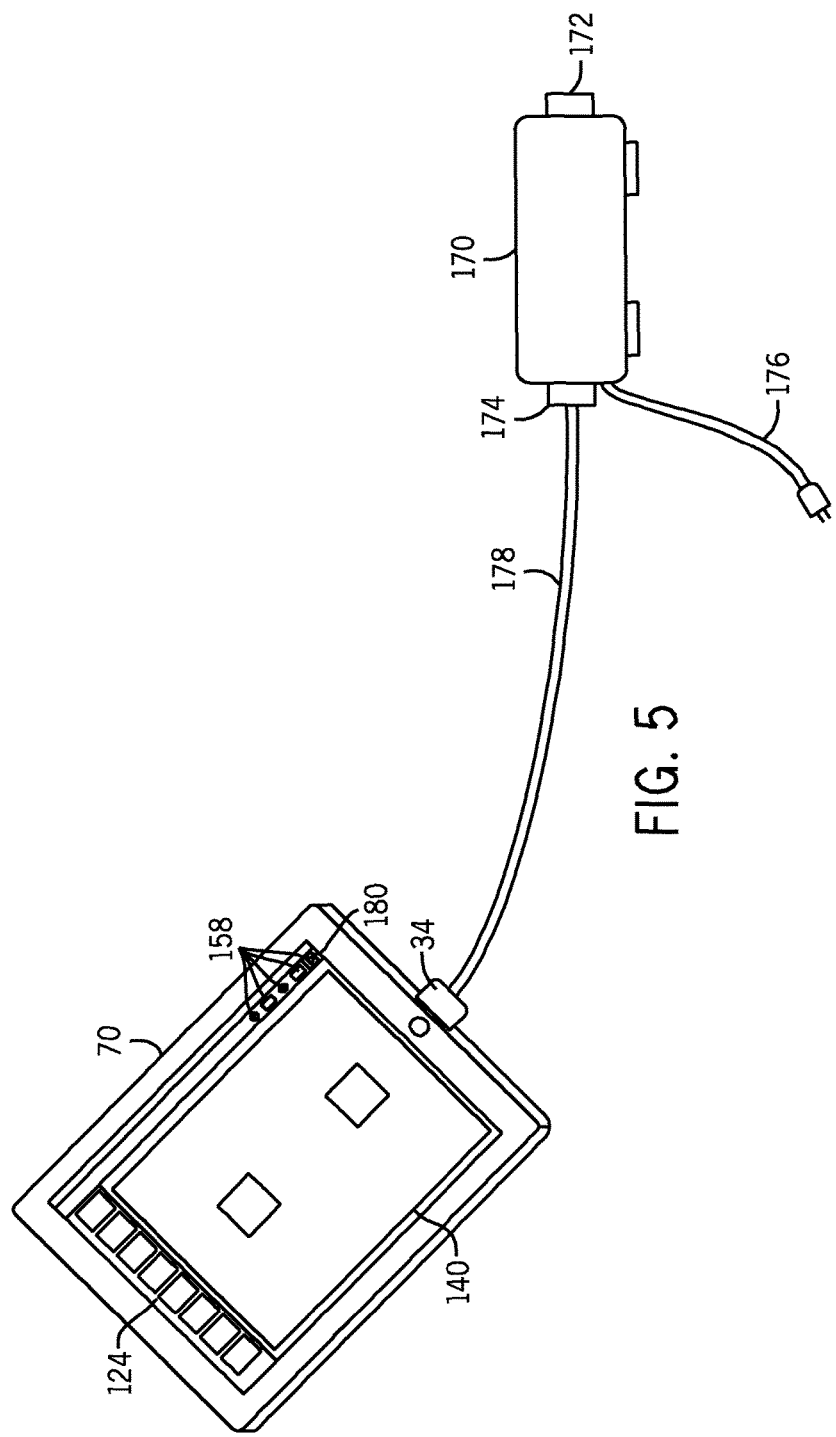
FIG. 5 depicts a perspective view of the electronic device coupled to an external projector in accordance with aspects of the present disclosure.

FIG. 5 depicts a perspective view of an embodiment of the electronic device 10, e.g., multi-function device 70, coupled to an external display, e.g., projector 170, in accordance with aspects of the present disclosure. The projector 170 may include a lens 172, one or more external ports 174, and a may be powered by a battery or a power cable 176 coupled to a power source. In one embodiment, the multi-function device 70 may be coupled to the external projector 170 through an interface cable 178 coupled to the external port 34 of the multi-function electronic device 70 and an external port 176 of the projector. In some embodiments, the projector 170 may receive power from the interface cable 178. The interface cable 178 may couple the multi-function device 70 the projector 170 by any suitable interface, such as USB, Firewire, DisplayPort, Mini DisplayPort, DVI, VGA, HDMI, component video, composite video, S-video, etc. In some embodiments, the interface cable 178 may convert from a first interface to a second interface, such as by including processing circuitry in the interface cable 178. In other embodiments, the multi-function electronic device 70 may be wirelessly coupled to the external projector 170 by any suitable wireless interface, such as Wi-Fi, WirelessHD, etc.

As shown in FIG. 5, the multi-function device 70 may display a slide 140 from a presentation application (and the user interface described above) executing on the multi-function device 70, as described above. As described in detail below, the multi-function device 70 may automatically detect connection to the projector 170 and the presentation application may provide an indication on the display 12. As shown in FIG. 5, for example, a "play video out" icon 180 may appear in the toolbar options 158 shown on the display 12, indicating that the external projector 170 is connected. The play video out icon 180 may be added as a new icon to the toolbar options 158 or may replace or transition from an existing icon on the toolbar options 158. A user may output (e.g., play) a presentation to the projector 170 by selecting (e.g., touching with an appendage or stylus, clicking with a mouse, etc.) the play video out icon 180.

Figure 6:
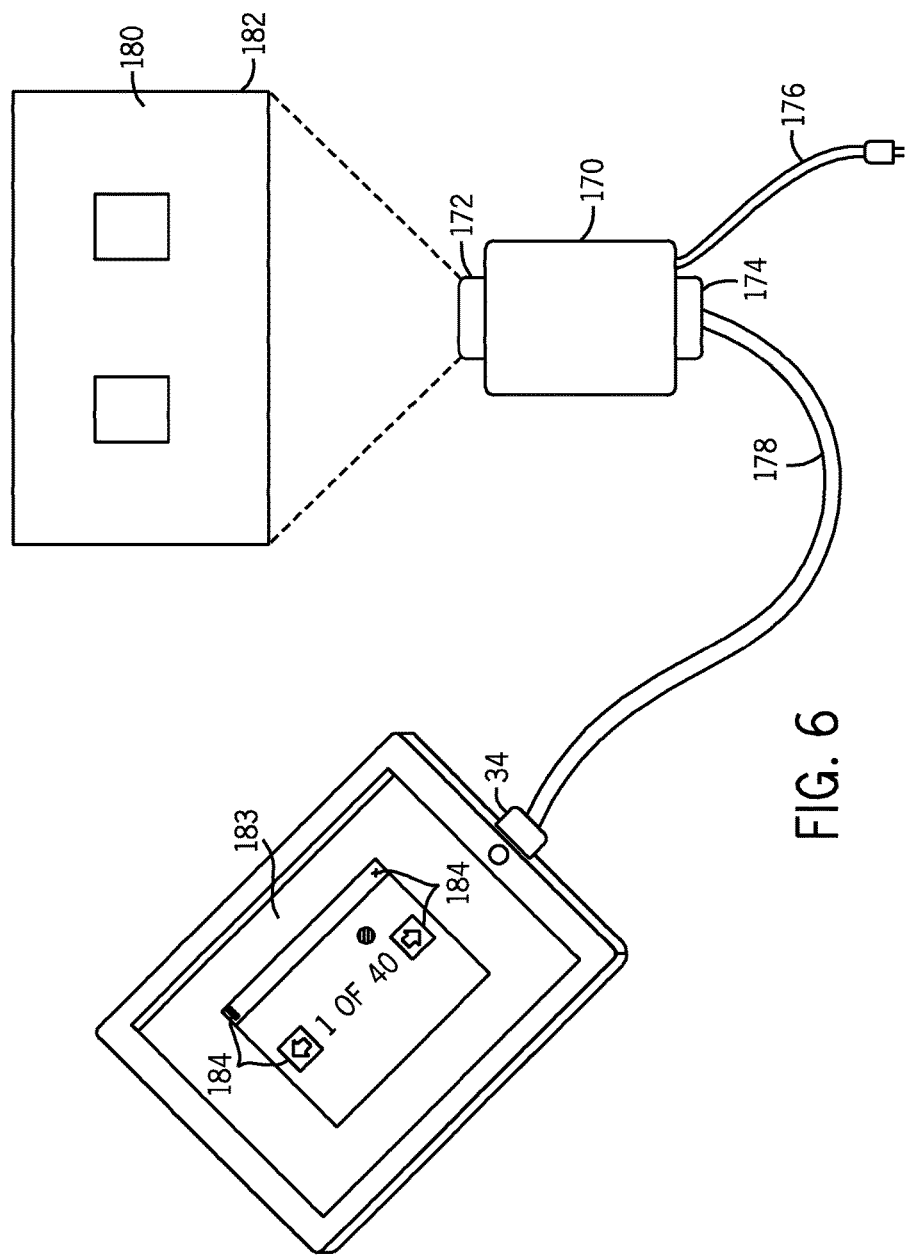
FIG. 6 depicts a perspective view of the electronic device operating in a video out mode in accordance with aspects of the present disclosure.

FIG. 6 depicts the multi-function device 70 operating in a video out mode in accordance with an embodiment of the present disclosure. As mentioned above, the video out mode may be activated through selection of the play video out icon 180. In the video out mode depicted in FIG. 6, the multi-function device 70 outputs the presentation to the projector 170 via the interface cable 178, and the projector 170 may project a slide 180 from the presentation application onto a projector screen 182. As explained further below, the slides of the presentation application may be cropped and/or resized to fit the projector's output resolution.

As also shown in FIG. 6, the video out mode of the multi-function electronic device 170 may include display of a video out user interface 183 The user interface 183 may include may include controls 184 on the display 12 of the multi-function electronic device 70. The controls 184, illustrated further below in FIGS. 7-9, may provide for control of the presentation via interaction with the user interface 183 through the touchscreen display 12 of the multi-function device 140. For example, the controls may include moving to the next slide, build or transition, moving to the previous slide, displaying the slide organizer or navigator pane 124, and/or exiting the video out mode.

Figure 7:
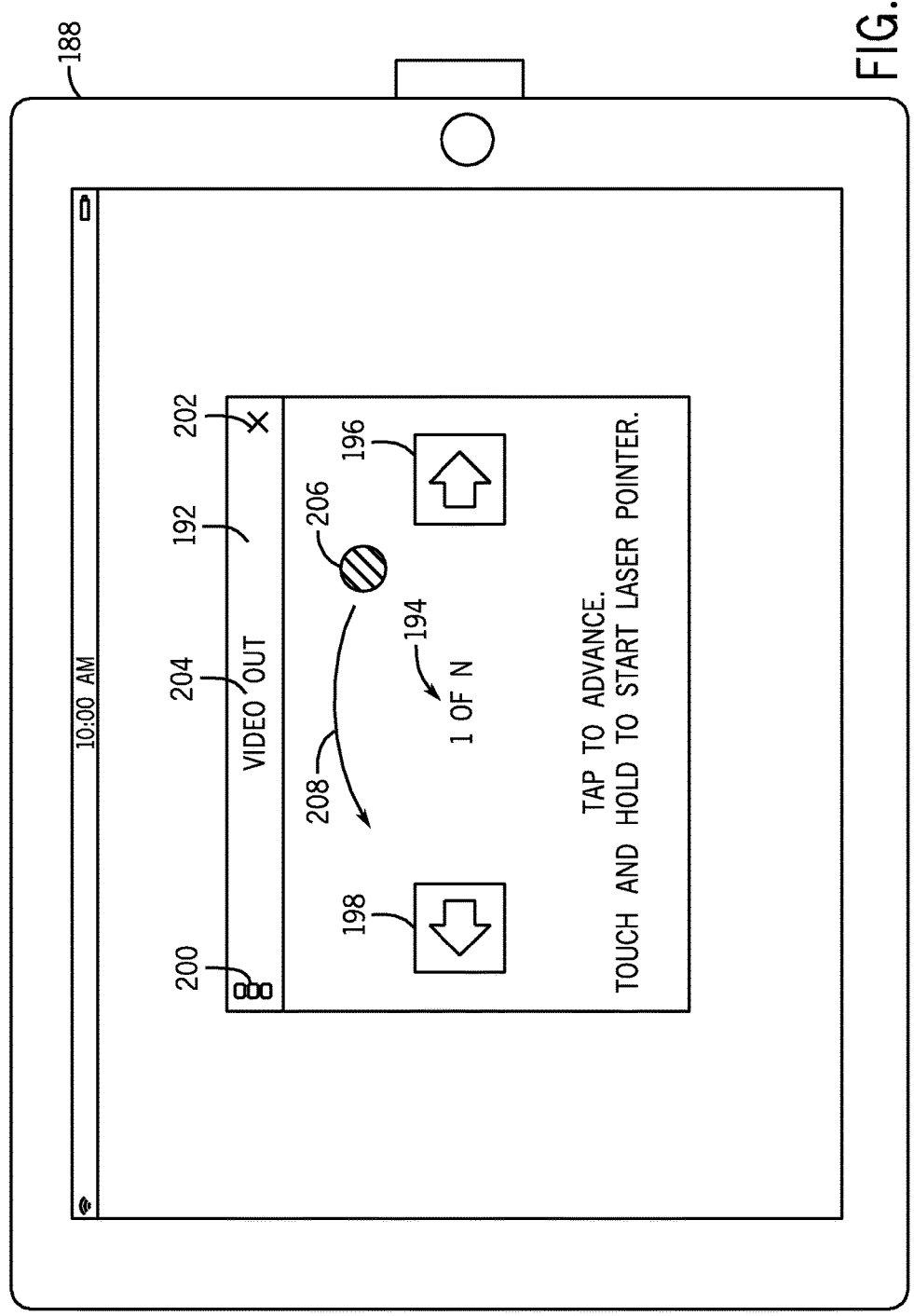
FIGS. 7-9 depict screens of the video out mode of the electronic device in accordance with aspects of the present disclosure.
Figure 8:
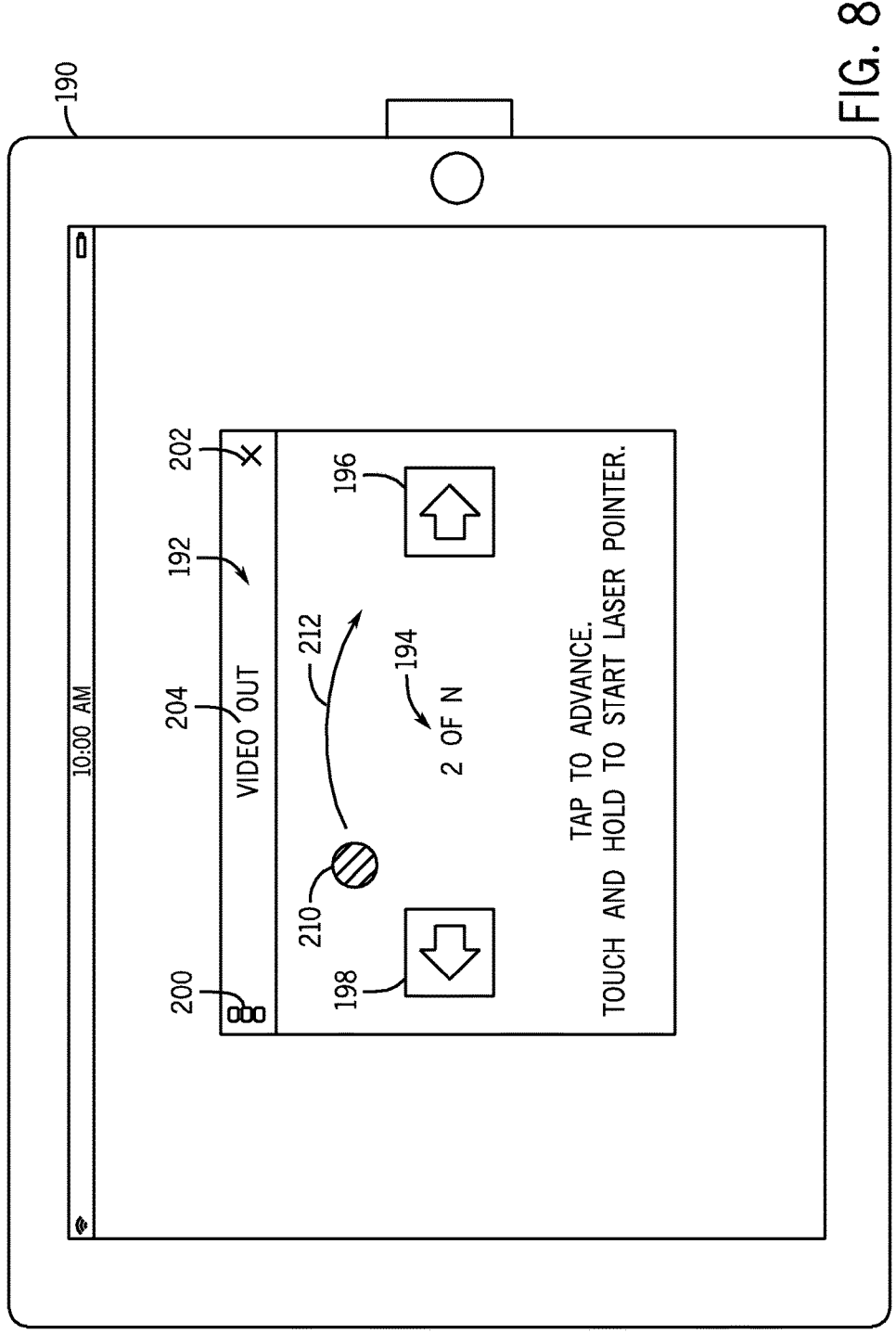
Figure 9:
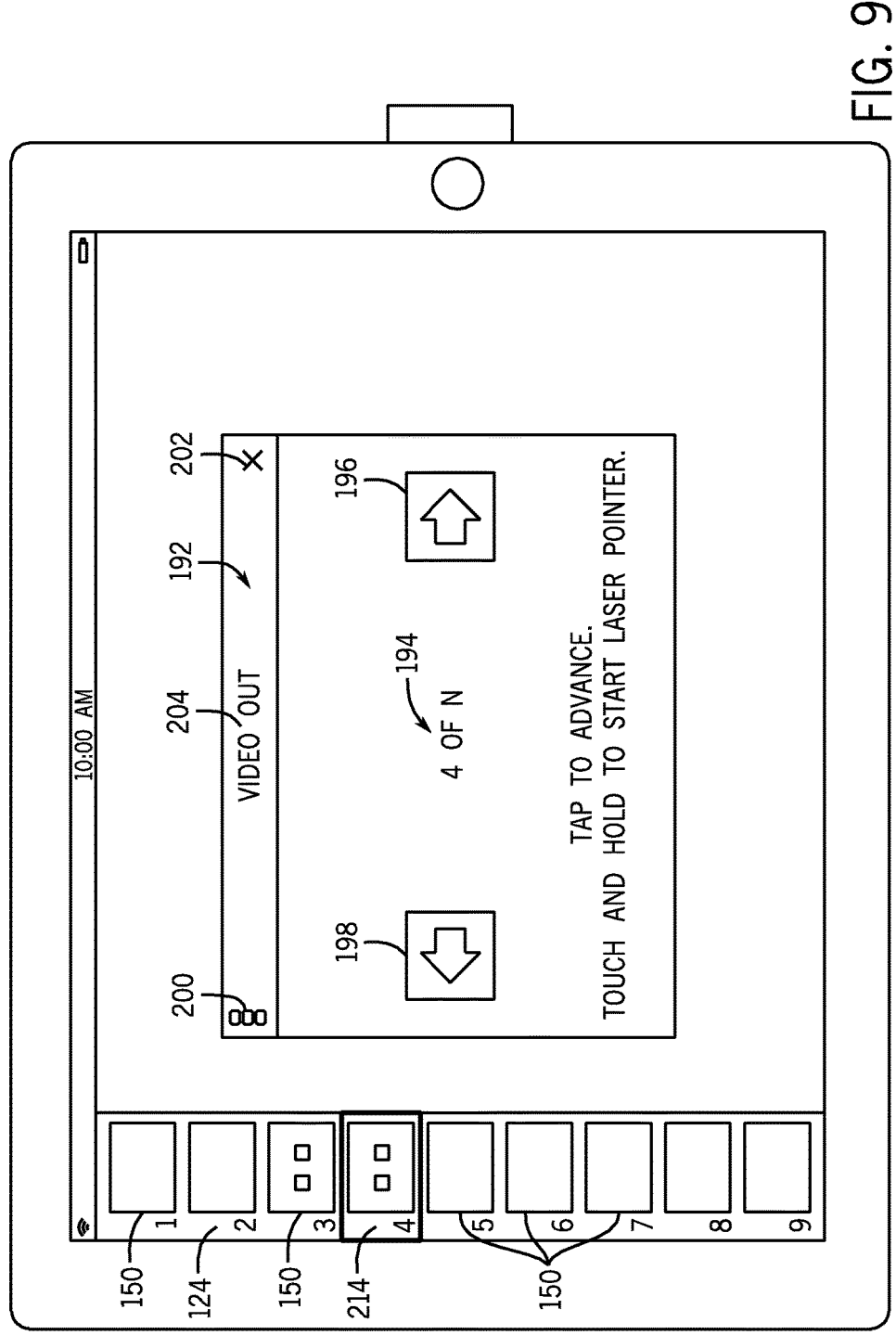

FIGS. 7-9 depict screens of the user interface 183 of the video out mode of the multi-function electronic device 70 in accordance with aspects of the present disclosure. Turning now to FIGS. 7 and 8, screens 188 and 190 of the display 12 of the multi-electronic device 70 are depicted during progression of a presentation. As shown in FIGS. 7 and 8, the screens 188 and 190 may include a status bar 192, a slide number indicator 194, and the controls 184 that may include an advance arrow 196, a previous arrow 198, a "Show/Hide Nav" icon 200, and an exit ("X") icon 202.

The status bar 192 includes a title 204 that may identify the current mode (e.g., "Video Out"), and the "Show/Hide Nav" icon 200, and the exit ("X") icon 202. As described below in FIG. 9, the navigator pane icon 200 may be selected to display the navigator pane 124 on the display 12. The exit icon 202 may be selected to exit the video out mode and stop output of the presentation to the projector 170. In some embodiments, exiting the video out mode may be performed by "double tapping" any region of the user interface 183, e.g., anywhere on screens 188 or 190.

The slide number indicator 194 indicates the number of the currently displayed slide (e.g., "1") and the total number of slides in the presentation (e.g., "N" number of slides). The currently displayed slide indicates the slide currently output to the projector 170 (and displayed on the projector screen 182). The presentation may be advanced to the next slide, build, or transition by selecting the advance arrow 196. As shown in FIG. 8, after selection of the advance arrow 196, the presentation advances to the next slide, build, or transition, (e.g., currently displayed slide "2"), and the projector 170 displays the current slide on the projector screen 182. Alternatively, in some embodiments, the multi-function electronic device 70 may receive gestures on the touchscreen display 12 to advance to the next slide, build, or transition. For example, as shown in FIG. 7, a user may select (e.g., touch) a region 206 on the display and "swipe" the region to the left, i.e., the direction indicated by arrow 208, to advance to the next slide, build, or transition. Any region on the display 12 may be selected and "swiped" to the left to advance the presentation. Further, in some embodiments, the presentation may be advanced by "tapping" any region on the display 12.

The presentation may be moved back to the previous slide, build, or transition by selecting the previous arrow 198. For example, to transition from slide "2" selected in FIG. 8 to slide "1" selected in FIG. 7, the previous arrow 198 may be selected (e.g., touched), and the projector 170 displays the previous slide, build, or transition on the projector screen 182. Alternatively, in some embodiments, the multi-function electronic device 70 may receive gestures on the touchscreen display 12 to move to the previous slide, build, or transition. For example, as shown in FIG. 8, a user may select a region 210 on the display and "swipe" the region to the right, i.e., the direction indicated by arrow 212, to advance the presentation to the previous slide, build, or transition. Any region on the display 12 may be selected and "swiped" to the right to move the presentation to the previous slide, build, or transition.

A user may also display the navigator pane 124 in the video out mode of the multi-function electronic device 70. As shown in FIG. 9, a user may select (e.g., touch) the "Show/Hide Nav" icon 200 to display the navigator pane on the display 12. The navigator pane 124 may transition into the display 12 by sliding, fading, or any other transition. In some embodiments, a user may display the navigator pane 124 by performing a gesture, e.g., "swiping" from the left edge of the display 12 to the right edge of the display 12. The navigator pane 124 displays the slide representations 150 and may operate in the manner described above in FIG. 4. In other embodiments, the navigator pane 124 may have reduced or limited functionality, such that only the functionality necessary to navigate the presentation is included. A user may move to any slide in the presentation by selecting (e.g., touching) the respective slide representation 150 displayed in the navigator pane 124. For example, as shown in FIG. 4, the navigator pane 124 depicts a selected slide representation (here depicted as slide 4, identified by highlighted region 214), that corresponds to the currently displayed slide (e.g., "4") in the slide number indicator 194. The selected slide representation changes to reflect the currently displayed slide as a user advances or moves backward in the presentation.

Figure 10:
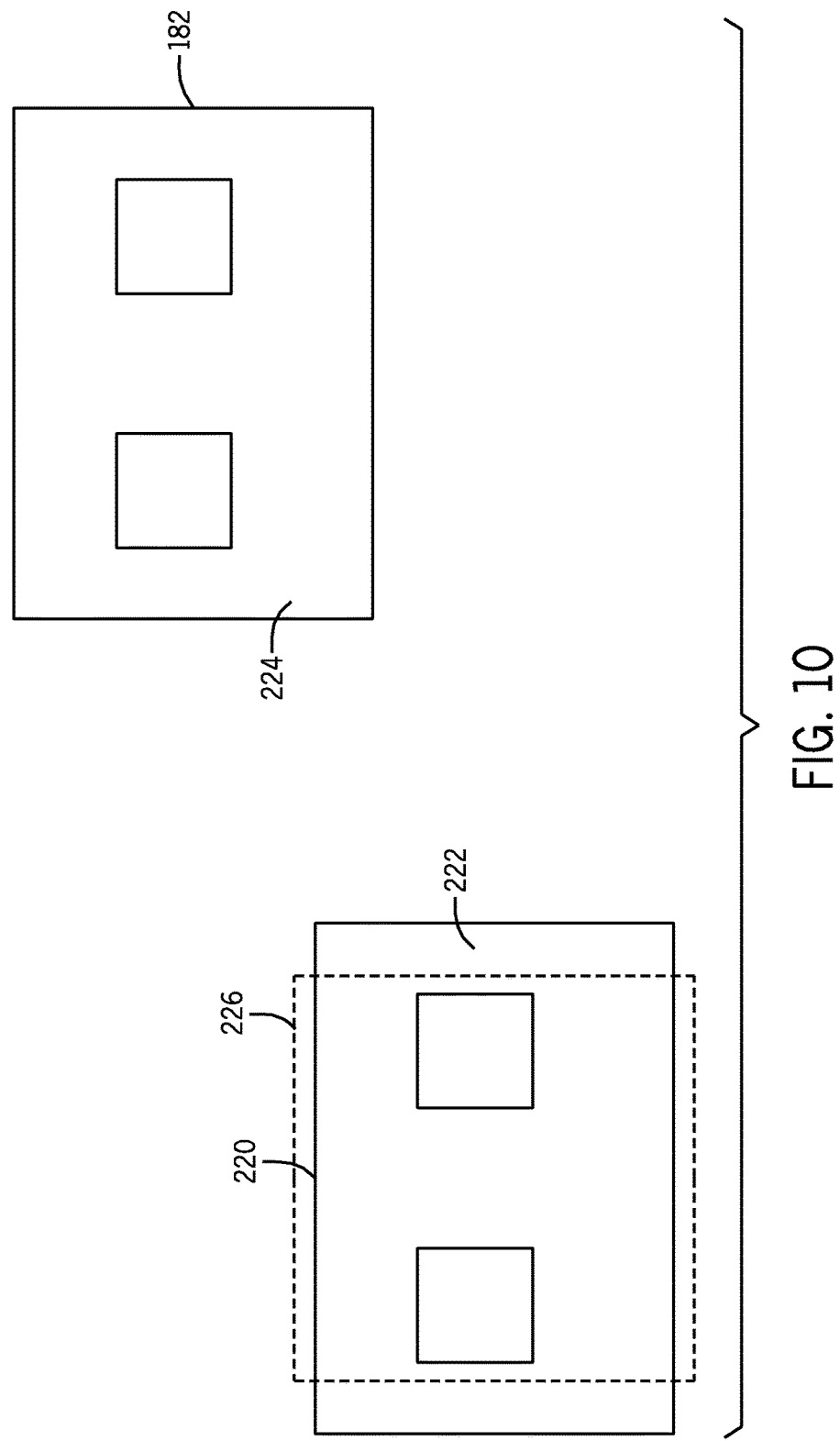
FIG. 10 depicts a mirroring in the video out mode of the electronic device in accordance with aspects of the present disclosure.

In some embodiments, the video out mode of the multi-function electronic device 70 may include a "mirror" mode such that the display 12 of the multi-function electronic device 70 displays the same image displayed by projector 170 on the projector screen 182. FIG. 10 depicts a screen 220 of the multi-function electronic device 70 displaying a slide 222 of a presentation mirrored on the projector screen 182. The projector 170 displays a slide 224, corresponding to slide 222 displayed on the multi-function electronic device 70, from output received from the multi-function electronic device 70, such as over the interface cable 178. The slide 222 displayed on the multi-function electronic device 70 "mirrors" the slide 224 displayed by the projector 170. A user may then monitor the presentation by viewing the currently displayed slide 222 on the multi-function device 70. A user may control the presentation by moving to the next slide, build, or transition, or the previous slide, build, or transition, by using the gestures described above and illustrated in FIGS. 7 and 8. A user may also use gestures, e.g., swiping from the left edge of the display 12 to the right edge, to display the navigator pane 124 in the "mirror" mode.

In some embodiments, the slide 222 displayed on the multi-function device 70 may be modified, e.g., cropped and/or resized, for display by the projector 170. The modification of the slide may be based on the dimensions of the slide 222, the display resolution of the projector 170, the resolution of the display 12 of the multi-function device 170, the display aspect ratio of the projector 170, the aspect ratio of the display 12 of the multi-function device 70, the contents of the slide 222, or any combination thereof. Additionally, as described further below, the projector 170 may include multiple display modes which may be selected to minimize modification of the slide 170. Further, the modification may ensure that any objects on the slide 222 are viewable on the slide 224 displayed by the projector 170. For example, as shown in FIG. 10, the slide 222 displayed on the multifunction device 70 may be cropped, based on the dashed region 226, and resized to fit the display resolution of the projector 170. Thus, in some embodiments, the slide 224 displayed by the projector 170 may correspond to the dashed region 226, and not the entire slide 222.

Figure 11:
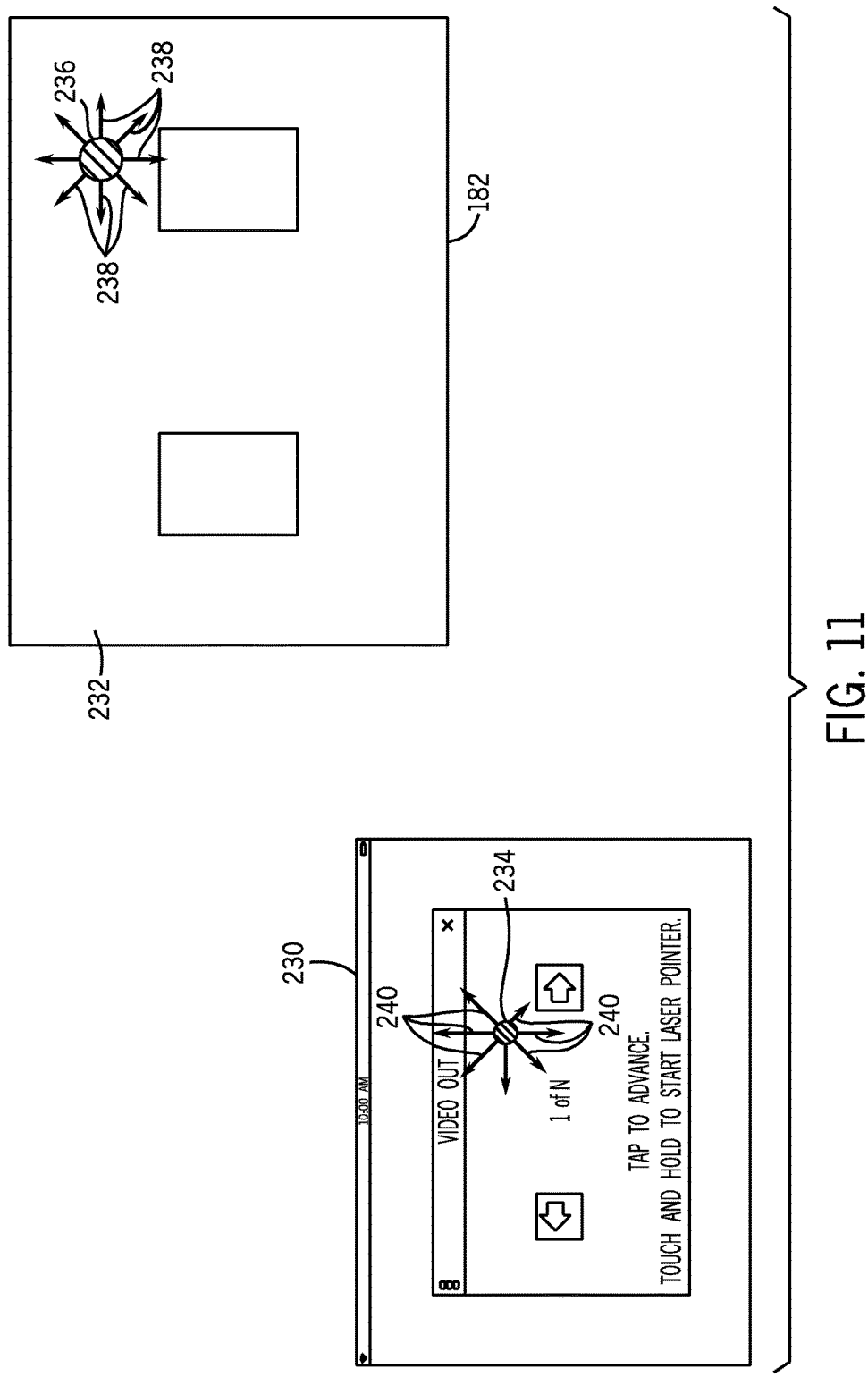
FIG. 11 depicts a pointer in the video out mode of the electronic device in accordance with aspects of the present disclosure.

In some embodiments, the video out mode may enable activation of a pointer, e.g., a simulated laser pointer, on the image displayed by the projector 170. FIG. 11 depicts a screen 230 of the display 12 of the multi-function electronic device 70 and a slide 232 displayed on the projector screen 182 illustrating the pointer function of the video out mode. FIG. 11 depicts the screen 230 of the user interface 183 of the video out mode discussed above in FIGS. 7-9. However, it should be appreciated that the pointer function may also be used in the "mirror" mode discussed above and illustrated in FIG. 10, or in any other video out mode of the multi-function electronic device 70.

In some embodiments, a user may activate the pointer by selecting (e.g., touching with an appendage or stylus, clicking and holding with a mouse button) any region of the display 12, such as region 234, for a threshold duration (e.g., 1 second, 2 seconds, 3, seconds, and so forth). After the user has selected the region 232 for the threshold duration, a pointer 236 corresponding to the contact on the display 12 appears on the image (e.g., slide 232) displayed by the projector 170. The pointer 236 maintains visibility on the slide 232 until the user deselects (e.g., removes a finger or stylus from the display, releases a mouse button, etc.) the display 12. The pointer 236 may be moved around the slide 232 displayed by the projector 170, as shown by arrows 238, by moving the selected region 234 on the display 12 (such as by moving an appendage or stylus over the display), as shown by arrows 240.

In some embodiments, the pointer on the image displayed by the projector 170 may simulate the look (e.g., brightness, color, size, shape, sharpness, etc.) of a laser pointer. For example, the pointer may be a red circle of a specific diameter similar to a emitting from a laser pointer pointed at the projection screen 182. The look (e.g., brightness, color, size, shape, sharpness, etc,) of the pointer may be customizable via options in the presentation application of the multi-function device 70.

Figure 12:
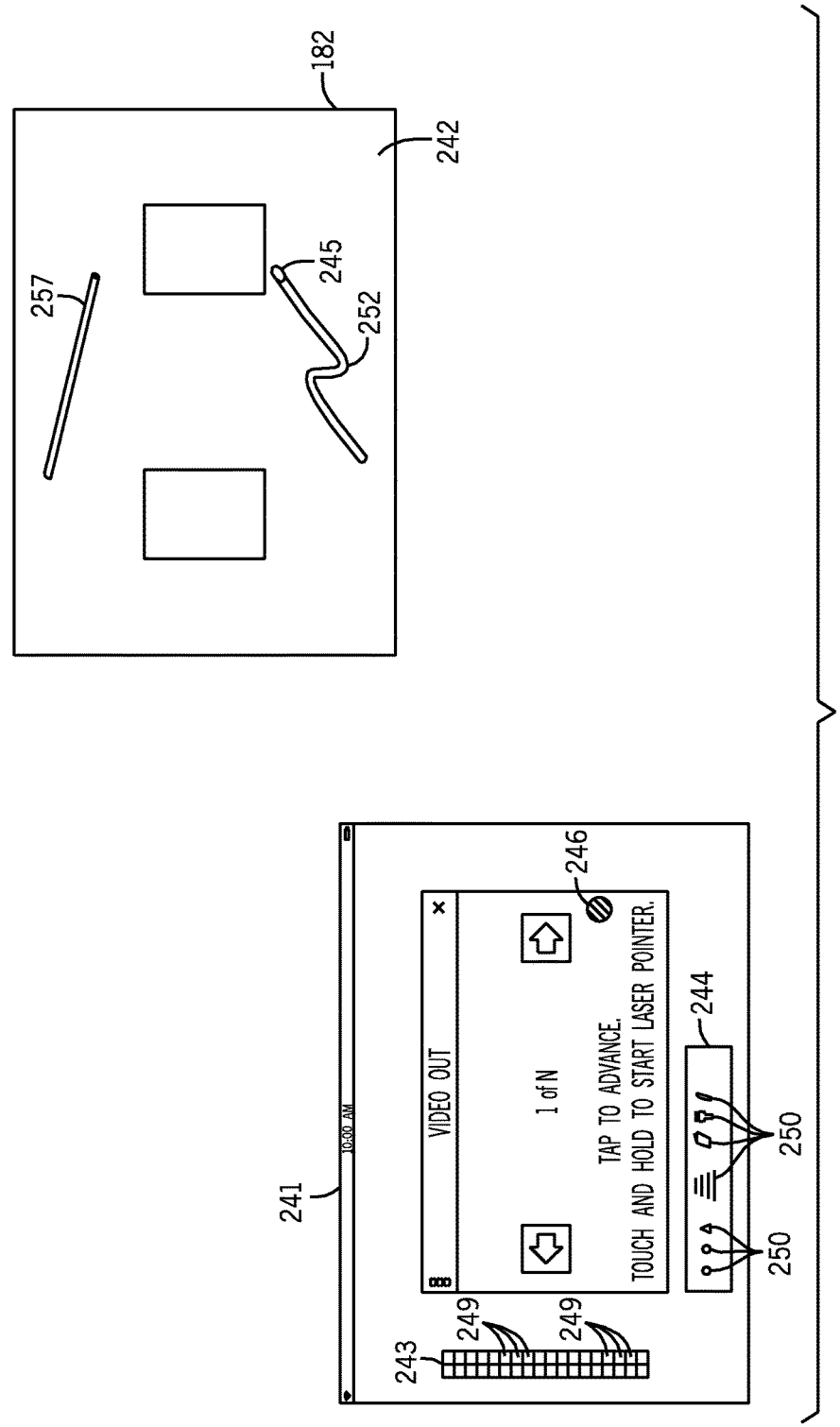
FIG. 12 depicts a drawing function of the video out mode of the electronic device in accordance with aspects of the present disclosure.

In other embodiments, the video out mode may include a drawing function to enable drawing static lines on the image displayed by the projector 170. FIG. 12 depicts a screen 241 of the display 12 of the multi-function electronic device 70 and a slide 242 displayed on the projector screen 182 illustrating the drawing function of the video out mode. FIG. 12 depicts the screen 241 of the user interface 183 of the video out mode discussed above in FIGS. 7-9. However, it should be appreciated that the drawing function may also be used in the "mirror" mode discussed above and illustrated in FIG. 10, or in any other video out mode of the multi-function electronic device 70.

The drawing mode depicted in screen 241 includes a color palette 243 and a tool palette 244. Activation of the drawing mode may create a drawing cursor 245 visible on the slide 242 displayed by the projector 170. The drawing cursor 246 may be moved on the slide 242 by moving a selected region, e.g., region 248, on the screen 241 of the multi-function electronic device 70. A user may activate the drawing function by selecting one of the toolbar options 158. In some embodiments, a user may activate the drawing function and display the color palette 243 and the tool palette 244 by performing a gesture or other action. For example, a user may activate the drawing function by "swiping" upward from the bottom edge of the display 12 to the top edge of the display edge 12. Similarly, a user may exit the drawing function by "swiping" downward from the top edge of the display 12 to the bottom edge of the display 12.

A user may select a color 249, or combination of colors, from the color palette 243, and may select a drawing tool 250 from the tool palette 244. For example, the drawing tools 250 may include attributes of the drawing cursor 245 such as shapes, line widths, brush strokes, brush types, etc. Additionally, the drawing tools 250 may include different pens, brushes, pencils, or any other suitable tool. After selecting a color and tool, a user may draw lines, e.g., lines 251 and 252, shapes, and other graphics, on the slide 242. The lines may be used to highlight text, images, or regions of interest on the slide 242. Additionally, the lines may remain on the slide 242 until erased by the user. In other embodiments, the lines may remain on the slide 244 until the presentation is moved to the next slide, build, or transition or previous slide, build, or transition. The tool palette 244 may also include an eraser 253. The eraser 253 may be selected (e.g., touched, clicked, etc.) to select the eraser and erase any regions of the slide 242 covered by the cursor 246. Alternatively, a user may "double-tap" (or double-click) the eraser 253 to erase every drawing, e.g., lines 251 and 252 and other drawings, on the slide 242.

In some embodiments, the drawing mode may provide for selection of multiple tools 250, e.g., pens, each having different colors and attributes. Additionally, each tool, e.g., pen, may be controlled by a different touch input. For example, a first pen having a first color and first set of attributes may be selected and controlled by a first touch input (e.g., gesture, appendage, stylus, etc.), and a second pen having a second color and second set of attributes may be controlled by a second touch input (e.g., gesture, appendage, stylus, etc.). In this manner, each pen may used to draw different colored lines on the slide using different touch inputs. For example, line 251 may be drawn by the first pen and line 252 may be drawn by the second pen.

Figure 13:
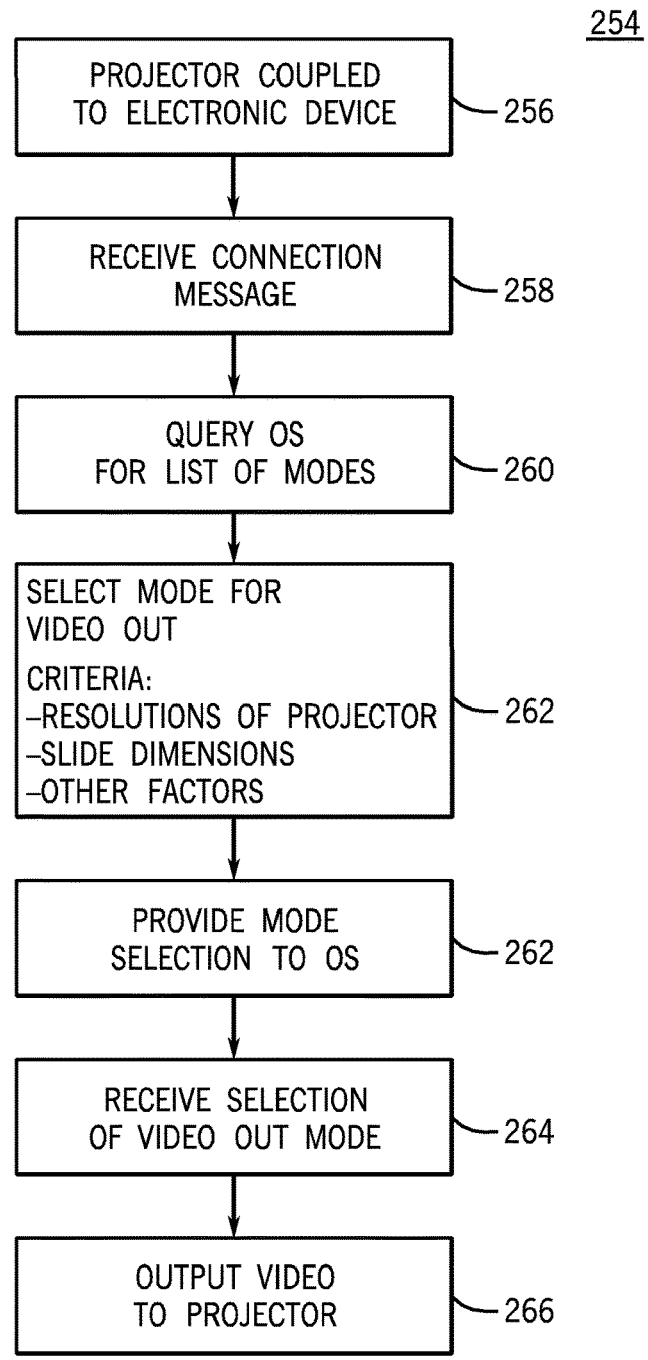
FIG. 13 is a flowchart depicting detection of an external display coupled to the electronic device in accordance with aspects of the present disclosure.

As mentioned above, the electronic device 10 may automatically detect the projector 170 when the projector 170 is coupled to the device 10, such as by the interface cable 178. FIG. 13 depicts a process 254 of the electronic device 10 for detecting the projector 170 and outputting video to the projector 170 in accordance with an embodiment of the present disclosure. The process 254 may be implemented as routines executable by a processor and stored as a computer program product on tangible computer-readable media, such as storage memory components 14. The process 254 may be initiated by coupling the projector 170 to the electronic device 10 (block 256), such as by the interface cable 178. The operating system of the electronic device 10 may detect connection of the projector 170 through hot plug functionality or any suitable functionally. Additionally, the operating system of the electronic device 10 may detect or receive the parameters of the projector 170, such as a list of the available display modes, e.g., resolutions, aspect ratios, etc. It should be appreciated that some display modes may be limited by the type of the interface cable 178, as lower bandwidth cables (e.g., component cables) may support lower resolutions.

After coupling the projector 170, the presentation application of the electronic device 10 may receive a message that the connection is received (block 258). For example, the message may be received from the operating system of the electronic device 10, or may be received by the presentation application monitoring a memory location, e.g., a register, or the electronic device 10. The presentation application may query the operating system for a list of display modes available for output on the projector 170 (block 260). The list of the display modes available may be identical or different than the list of display modes detected or received by the OS from the projector 170.

After obtaining the list of modes, the presentation application may select an appropriate display mode for output on the projector 170 (block 262). As mentioned, the criteria for selection of the display mode may include the dimensions of the slides of a presentation, the resolution of the display mode, the aspect ratio of the display, any other suitable criteria, or any combination thereof. The presentation application may make the selection based on the best "fit" of the slides of a presentation to a respective display mode, so as to minimize any modification of the slides as discussed above in FIG. 10.

After the selection, the presentation application may provide a selected mode (e.g., resolution, aspect ratio, and so forth), or an indication thereof, to the operating system of the electronic device 10 (block 264). A user may then switch to video out mode, such as by selecting the play video out icon 180, and the presentation application then receives the selection (block 266). The electronic device 10 then switches to output video to the projector 170 (block 268), such as by using the display mode selected by the presentation application and provided to the operating system.

Figure 14:
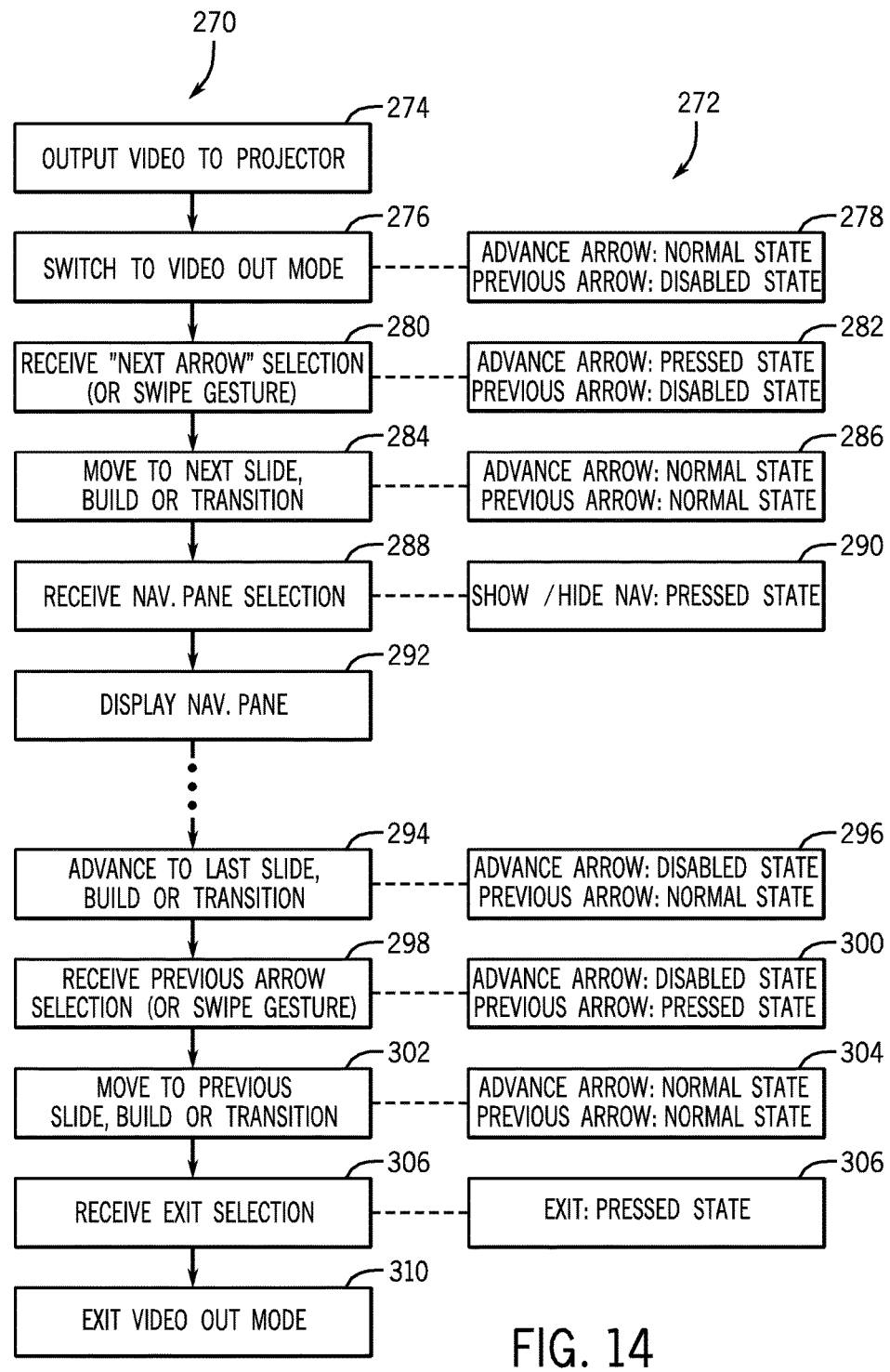
FIG. 14 is a flowchart depicting operation of the video out mode of the electronic device in accordance with aspects of the present disclosure.

FIG. 14 depicts a process 270 for progression through a presentation using the video out mode described above. Additionally, in some embodiments, each of the controls 184 of the presentation application may have or be associated with different states. These states may be detected by the presentation application to determine if the control has been selected. For example, the states may include a "normal" state in which the control 184 is displayed and selectable, a "pressed" state in which the control 184 is selected, and a "disabled" state in which the control 184 is displayed but not selectable. Accordingly, FIG. 14 also includes the states 272 of the advance arrow 196, previous arrow 198, and other controls 184 displayed in the video out mode. The "Show/Hide Nav" icon 200 and the exit icon 202 may be assumed to be in a "normal" state except where indicated.

As described above, the electronic device 10 may output video to the projector 170 (block 274), such as in response to selection of the play video out icon 180, and the electronic device 10 may switch to the video out mode (block 276) depicted in FIGS. 7-9. As shown in FIG. 7, the initial display of the video out mode may correspond to display of the first slide of a presentation (e.g., slide "1" of "N"). Accordingly, the advance arrow 196 may be in or detected as a "normal" state and the previous arrow 198 may be in or detected as a "disabled" state as there is no previous slide, build or transition (block 278).

A user may select the next arrow 196 to advance to the next slide, build, or transition (block 280). Accordingly, the advance arrow 196 may be in or detected as a "pressed" state and the previous arrow 198 may remain in the "disabled" state (block 282). Alternatively, a user may advance to the next slide, build, or transition by performing a "swipe" gesture in the appropriate direction. After the next arrow 196 is selected, the presentation advances to the next slide, build, or transition (block 284). As there is a previous slide, build, or transition, both the advance arrow 196 and the previous arrow 198 may be in or detected as a "normal" state (block 286).

During the presentation, a user may select the "Show/Hide Nav" icon 200 to display the navigator pane 124 in the video out mode (block 288). After selecting the "Show/Hide Nav" icon 200, the "Show/Hide Nav" icon may be in or be detected as a "pressed" state (block 290) indicating to the presentation application that the icon is selected. After selection, the navigator pane 124 may be displayed on the display 12 of the electronic device 10.

As the user progresses through the presentation, the presentation application may advance to the last slide, build or transition of the presentation (block 294). After displaying the last slide, build, transition, the slide number indicator 124 may indicate that there are no more slides, builds, or transitions remaining in the presentation. Accordingly, the advance arrow 196 may be in or detected as a "disabled" state, as the advance arrow 196 is disabled and not selectable. The previous arrow 198 may be in or be detected as a "normal" state (block 296), so a user may move to the previous slide, build, or transition.

The presentation application may then receive a user's selection of the previous arrow 198 (block 298). Accordingly, the previous arrow 198 may be in or detected as a "pressed" state and the advance arrow 198 may remain in the "disabled" state (block 300), until the previous slide, build, or transition is displayed. Alternatively, a user may move to the previous slide, build, or transition by performing a "swipe" gesture in the appropriate direction (as shown in FIG. 8). After the previous arrow 198 is selected, the presentation moves to the previous slide, build, or transition (block 302). After returning to the previous slide, build, or transition (such that there is at least one slide, build, or transition remaining in the presentation), both the next arrow 196 and the advance arrow 198 may be in or detected as a "normal" state (block 304).

To exit the presentation, the user may select the exit icon 202 (block 306). Accordingly, after this selection the exit icon may be in or detected as a "pressed" state (block 308). After selecting the exit icon, the electronic device 10 may exit the video out mode (block 310) and stop providing output to the projector 170.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a touch-sensitive display;
a port configured to couple to an external display;
a memory configured to store one or more presentation application routines; and
a processing component configured to execute the one or more presentation application routines which, when executed cause the electronic device to:
display on the touch-sensitive display a presentation mode when the electronic device is not coupled to the external display;
switch from the presentation mode to a control mode on the touch-sensitive display when the electronic device is coupled to the external display, wherein the control mode visually depicts one or more controls on the touch-sensitive display of the electronic device which, in response, to a touch input, cause a presentation displayed in the presentation mode on the external display to advance to a next slide, to return to a previous slide, or to invoke a build or transition associated with the presentation; wherein each of the touch-sensitive controls comprises a first state indicating that the control is selectable and a second state indicating that the control is selected; and
display the control mode when the electronic device is coupled to the external display.

2. The electronic device of claim 1, wherein the external display comprises a projector.

3. The electronic device of claim 1, wherein some or all of the controls depicted on the touch-sensitive display comprise a third state indicating that the control is disabled.

4. The electronic device of claim 1, wherein the controls depicted on the touch-sensitive display comprise a first control for advancing the presentation and a second control for moving to a previous state or slide of the presentation.

5. The electronic device of claim 1, wherein the controls depicted on the touch-sensitive display comprise a control displaying a navigator pane on the touch-sensitive display.

6. The electronic device of claim 1, wherein the controls depicted on the touch-sensitive display comprise a control for exiting the control mode and displaying the presentation mode on the touch-sensitive display.

7. The electronic device of claim 1, wherein the control mode displayed on the touch-sensitive display of the electronic device comprises one or both of a status indicating progress through the presentation or a slide number indicator indicating the number of the slide currently being displayed on the external display.

8. The electronic device of claim 1, wherein the control mode is configured to receive a plurality of gestures for controlling the presentation.

9. The electronic device of claim 1, wherein the control mode displayed on the touch-sensitive display comprises a visual representation of a slide concurrently being displayed on the external display.

10. The electronic device of claim 1, wherein the the control mode comprises a video out mode in which the electronic device displays a video output of the presentation on the external display and separately displays a control interface for the presentation on the touch-sensitive display of the electronic device.

11. Computer-readable, non-transitory media comprising a computer program product, the computer program product comprising routines which, when executed on a processor, perform the following:

displaying one or more slides on a display of an electronic device executing the computer program product;

detecting a coupling of an external display to the electronic device;

querying an operating system (OS) running on the device for a list of display modes available for output to the external display and supported by the OS, wherein the display modes correspond to one or both of resolution or aspect ratio;

selecting a display mode from the list of available display modes based on at least the dimensions of the one or more slides;

notifying the OS of the selected display mode;

displaying the one or more slides on the external display at the selected display mode;

switching from displaying the one or more slides to visually depicting one or more controls on the display of the electronic device when the external display is coupled to the electronic device, wherein the one or more controls are configured to control the one or more slides displayed on the external display; and visually depicting the one or more controls on the display of the electronic device.

12. The computer-readable, non-transitory media of claim 11, wherein the selection of the display mode based on the dimensions of the one or more slides takes into account which available display mode would involve the least modifications to be made to the one or more slides to be displayed at the respective display mode.

13. The computer-readable, non-transitory media of claim 11, wherein switching from displaying the one or more slides to visually depicting the one or more controls on the display of the electronic device occurs when the external display is coupled to the electronic device and when an icon displayed on the display of the electronic device is selected, wherein the icon indicates that the external display is coupled to the electronic device.

14. The computer-readable, non-transitory media of claim 13, wherein the selection of the display mode is further based on the content of the one or more slides.

15. The computer-readable, non-transitory media of claim 13, wherein displaying the one or more slides further comprises modifying the one or more slides for display on the external display at the selected display mode.

16. The computer-readable, non-transitory media of claim 15, wherein modifying the one or more slides comprises one or more of cropping or resizing the one or more slides.

17. Computer-readable, non-transitory media comprising a computer program product, the computer program product comprising routines which, when executed on a processor, perform the following:

displaying a slide presentation on a touch-sensitive display of an electronic device;

providing output of the slide presentation to an external display coupled to the electronic device;

switching from displaying the slide presentation to displaying an interface on the touch-sensitive display of the electronic device when the external display is coupled to the electronic device, wherein the interface controls the slide presentation displayed on the external display;

displaying the interface on the touch-sensitive display;

detecting a touch on the touch-sensitive display; and displaying a simulated laser pointer on the external display based on the touch exceeding a threshold duration, wherein the display of the simulated laser pointer is customizable.

18. The computer-readable, non-transitory media of claim 17, comprising moving the pointer on the external display in response to movement of the touch on the touch-sensitive display.

19. A method comprising:

displaying a first interface comprising a presentation mode on a touch-sensitive display of an electronic device;

detecting a coupling of an external display to the electronic device;

receiving a command to provide output to the external display;

providing output to the external display;

switching from displaying the first interface to displaying a second interface on the touch-sensitive display of the electronic device when the external display is coupled to the electronic device, wherein the second interface comprises a control mode different from the presentation mode, the second interface visually depicting one or more controls on the touch-sensitive display of the electronic device which, in response, to a touch input, cause a presentation displayed on the external display to advance to a next slide, to return to a previous slide, or to invoke a build or transition associated with the presentation; and displaying the second interface on the touch-sensitive display of the electronic device when the external display is coupled to the electronic device.

20. The method of claim 19, comprising detecting one or a plurality of states of each of one or more controls depicted on the touch-sensitive display.

21. The method of claim 19, comprising modifying one or more slides of the presentation for display on the external display, wherein the modifying comprises cropping and/or resizing the one or more slides.

22. The method of claim 19, comprising stopping the output to the external display based on detection of a selection of one of the controls depicted on the touch sensitive display.

* * * * *